United States Patent [19]

Inamiya

[11] Patent Number: 5,105,198
[45] Date of Patent: * Apr. 14, 1992

[54] METHOD OF DETERMINING A POSITION USING SATELLITES

[75] Inventor: Kenichi Inamiya, Kamakura, Japan

[73] Assignee: Mitsubishi Denki Kabushiki Kaisha, Japan

[*] Notice: The portion of the term of this patent subsequent to Jan. 22, 2008 has been disclaimed.

[21] Appl. No.: 571,760

[22] Filed: Aug. 23, 1990

Related U.S. Application Data

[63] Continuation-in-part of Ser. No. 461,536, Jan. 5, 1990, Pat. No. 4,987,420.

[30] Foreign Application Priority Data

Jan. 11, 1989 [JP] Japan ................................ 1-4361
Feb. 14, 1989 [JP] Japan ................................ 1-34069
Feb. 15, 1989 [JP] Japan ................................ 1-35381
Aug. 23, 1989 [JP] Japan ................................ 1-216466

[51] Int. Cl.$^5$ .......................................... H04B 7/185
[52] U.S. Cl. .................................. 342/457; 342/352; 342/357
[58] Field of Search ................... 342/457, 352, 357

[56] References Cited

U.S. PATENT DOCUMENTS 4,987,420 1/1991 Inamiya ........................... 342/457

Primary Examiner—Mark Hellner
Attorney, Agent, or Firm—Wolf, Greenfield & Sacks

[57] ABSTRACT

A method of determining the position of an observation point on the earth using M satellites on geosynchronous orbits having predetermined orbit inclination angle such that N (<M) satellites are in the range of vision of the observation point. One of the N satellites generates a reference signal at a known time. This reference signal is sent directly to the observation point, sequentially relayed to the remaining subsequent satellites and transmitted from the respective satellites in order upon receiving the reference signal from a preceding adjacent satellite to the observation point. The observation point measures the differences in time of reception of the signals from the N satellites. The position of the observation point is determined as an intersecting point of the hyperboloids each having foci on adjacent two of the satellite positions.

16 Claims, 24 Drawing Sheets

Fig. 14
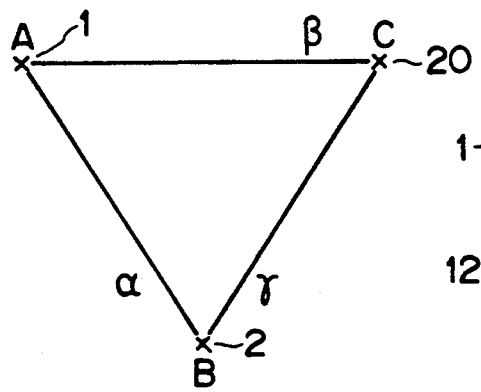
Fig. 15
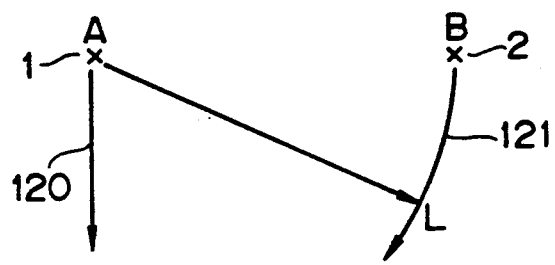
Fig. 16
(a) 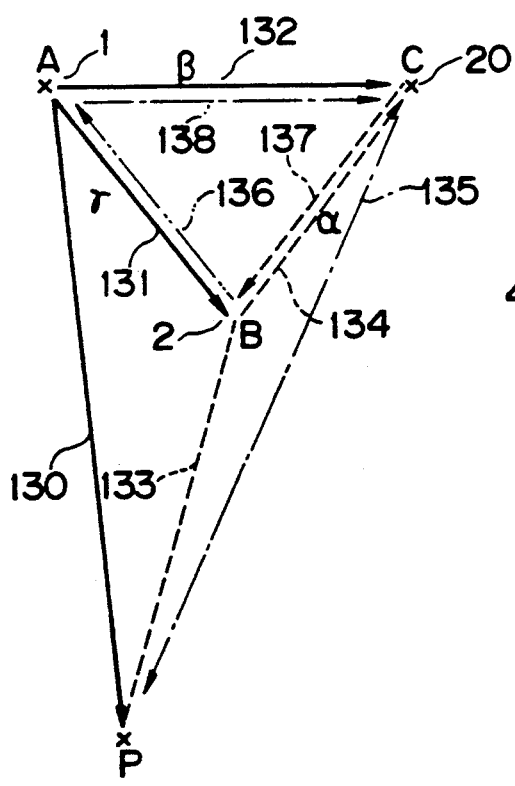
(b) 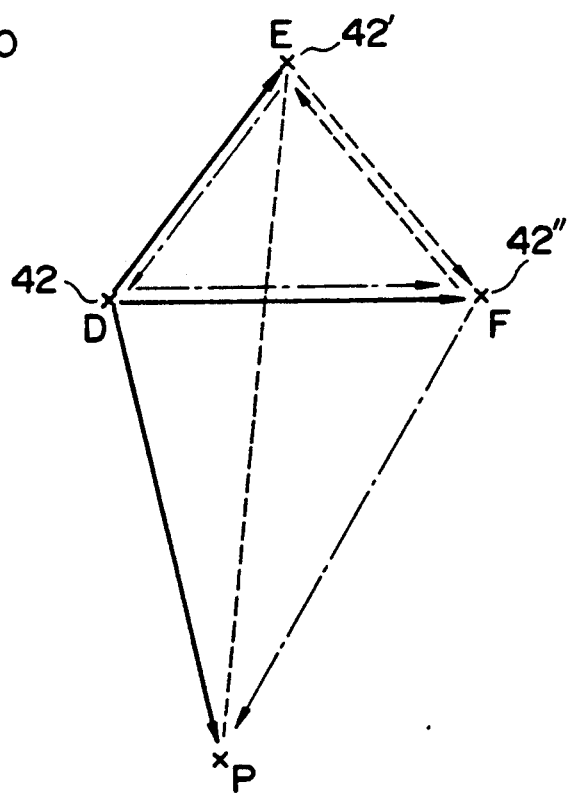

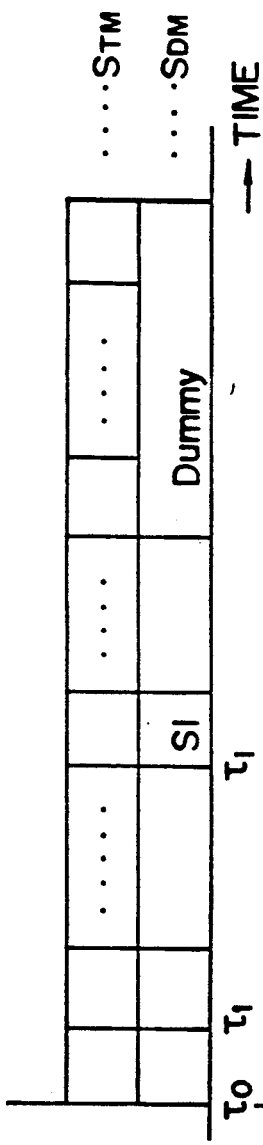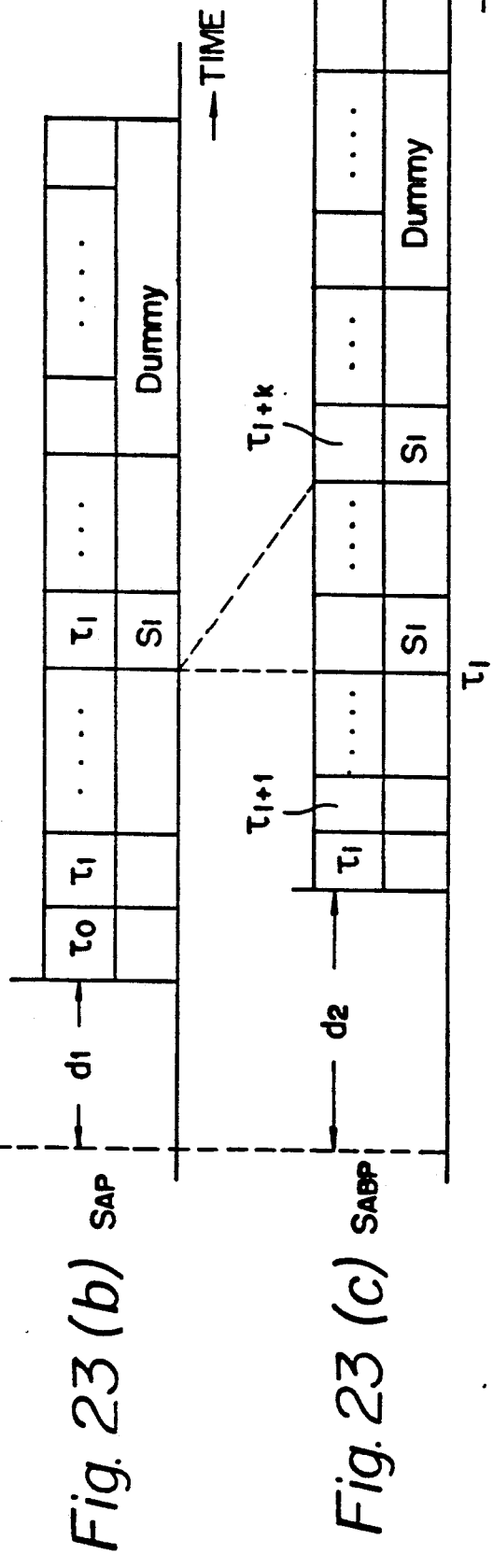
Fig.23(a) $S_A$
Fig.23(b) $S_{AP}$
Fig.23(c) $S_{ABP}$

METHOD OF DETERMINING A POSITION USING SATELLITES

This application is a continuation-in-part of the application Ser. No. 461,536 filed Jan. 5, 1990, now U.S. Pat. No. 4,987,420.

BACKGROUND OF THE INVENTION

1. Field of the Invention

This invention relates to a method of determining the position of a signal reception point by receiving and processing radio wave signals transmitted from satellites on geosynchronous orbits.

2. Prior Art

As conventional radio wave navigation systems, such as Decca, Omega and Loran-C which have oscillation sources on the earth are known. NNSS (Navy Navigation Satellite System) and GP (Global Positioning System), both using satellites are also known. The systems using satellites allow the basis of position determination to be expanded to cosmic space so that enhanced accuracy in position measurement ca be expected by the increased range of position detection and the provision of high grade equipment. The GPS is a type of system that measures range by time and has many superior performance characteristics in comparison with NNSS which uses the Doppler effect, and is going to be a main system for navigation satellites in the future. The prior art will further be described with reference to such GPS in order to compare the present invention therewith.

FIG. 1 illustrates the disposition of GPS satellites. NAVSTAR (Navigation System with Timing and Ranging) satellites 300, 301, 302, and 303 are at positions A′, B′, C′ and D′. Each of the satellites has an accurate atomic clock to precisely maintain the accuracy of clock signals generated thereby. The atomic clock is calibrated by a signal sent from a control station on the earth so a to accurately tell the current time on the basis of the beginning of a week. The positions of NAVSTAR satellites are determined by the time at a specified instance since the control station determines their orbits from the tracking data of the satellites. Thus, if an observer were at the position of a NAVSTAR satellite, the current time of the satellite and the orbit elements serve to determine the position of the observer. Then, the case where the observer observes the satellite at a position away therefrom is considered, the observation point being designated by P′. Assume that the observer has a clock with no calibrated high accuracy and with a fixed error from a reference time, and that when clocks on the satellites point to a time $Tn_o$, the clock of the observer points to a time $(Tn_o + \Delta t)$, where $\Delta t$ is an inherent error in the observer. Satellites 300, 301, 302, 303 are assumed to be measured by the observer at times $Tn_1$, $Tn_2$, $Tn_3$ and $Tn_4$, respectively. Taking into consideration the propagation time between the observer and the satellites, the following equations are obtained.

$$A'P = C(Tn_0 + \Delta t - Tn_1)$$

$$B'P = C(Tn_0 + \Delta t\ Tn_2)$$

$$C'P = C(Tn_0 + \Delta t - Tn_3)$$

$$D'P = C(Tn_0 + \Delta t\ Tn_4)$$

where, C is the velocity of light.

The above Equations have, as their unknown factors, $\Delta t$ and three three-dimensional values defining the position P′. The Equations thus have solutions to enable the observer's position and time to be calibrated.

The NAVSTAR satellites are on six circular 12-hour orbits at the altitude of 20 degree, 183 km, the orbit inclination being at 55 degrees. Three satellites are positioned at an equal distance on each of such six orbits and totally 18 satellites are moving in the six orbits. The positions of the satellites are determined such that four of them are always visible from any point on the earth.

One control station and at least four monitoring stations are provided on the earth. Each station receives data and transmits necessary commands when the four satellites are in the visible range. Processing of the orbit data is performed by data processing equipment on the basis of the obtained data, and the time of the calibration is practised on the basis of information from the primary reference.

GPS requires at least 18 NAVSTAR satellites to enable position measuring at all points on the earth, and also requires highly accurate clocks and frequencies for generating original data for range measurement. Thus they must be equipped with costly atomic clocks in order to maintain a measurement accuracy for a long period so that the control station can calibrate them once a week to maintain changes in time and frequencies within allowable ranges.

SUMMARY OF THE INVENTION

It is an object of the present invention to solve the above mentioned problems and provide a method of determining the position of an observation point, which is easier than and brings about the same advantages as conventional methods.

In order to attain this object, a method of determining the position of an observation point on the earth in accordance with the present invention can be determined by using M satellites disposed on geosynchronous orbits having a predetermined orbit inclination angle with respect to the equitorial plane such that a sequence of N satellites (N<M) are simultaneously disposed in the range of vision of the observation point. The method comprises the steps of:

a. transmitting a reference signal at a predetermined time from a first one of the N satellites to the observation point and a second satellite;

(b) causing the second to (N )th satellites to each in sequence relay in this order the reference signal received from the preceding satellite to the observation point and the subsequent satellite; said second to Nth satellites sending signals to the observation point when the reference signal is received;

c. measuring at the observation point the arrival times of the signals transmitted from the N satellites;

d. calculating the position of each of the N satellites on the basis of the times obtained in the step (c) and estimated values of the orbit parameters of the satellites within said geosynchronous orbits provided by a control station on the earth; and e. determining at least three hyperboloids each placing the foci on adjacent two of the calculated positions of the N satellites, whereby the position of the observation point is determined at an intersecting point of the hyperboloids.

The above step (e) may include the step of calculating the mutual range between adjacent two of the N satellites.

In an embodiment of the invention, five or more satellites are disposed on geosynchronous orbits having the orbit inclination angle of substantially 6 degrees with respect to the equitorial plane such that a sequence of four satellites are disposed to be simultaneously in the range of vision of the observation point and that the anomalies of the four satellites are separated from one another substantially at an angle of 120 degrees, (a) a reference signal is transmitted at a predetermined time from a first one of the four satellites to the observation point and a second satellite adjacent to the first satellite; (b) the reference signals are sequentially relayed by each of the second and third satellites to each of the adjacent third and fourth satellites; (c) the received reference signals are in sequential order transmitted from each of the respective second to fourth satellites to the observation point each upon receipt of a reference signal from the respective preceding adjacent satellite; (d) the times of reception of the signals transmitted from the four satellites are determined a the observation point; (e) the positions of the four satellites are calculated by using the determined times and estimated values of the orbit parameters of the satellites within the geosynchronous orbits obtained from a control station on the earth; and (f) three hyperboloids each placing the foci on adjacent two of the calculated positions of the four satellites are determined, whereby the position of the observation point is determined as an intersecting point of the hyperboloids.

The first satellite can transmit the reference signal at a time calibrated by the control station. The calibrated time may be an integral-second time. Each of the satellites in this embodiment can calculate the mutual range between adjacent two satellites and transmit to the observation point a signal concerning the calculated mutual range, and comprises a clock means calibrated by a signal sent from the control station, a means responsive to the calibrated clock means for transmitting the reference signal to the observation point and a means for transmitting the received reference signal to the observation point and an adjacent satellite.

In another embodiment of the invention, five or more satellites are disposed on a geosynchronous orbit having the orbit inclination angle of substantially 6–10 degrees with respect to the equitorial plane such that adjacent four satellites are disposed to be simultaneously in the range of vision of the observation point and that the anomalies of the four satellites are separated from one another substantially at an angle of 120 degrees, (a) a synthesized signal including a time signal designating a transmission time and a reference signal synchronized with the time signal is transmitted from a first one of the four adjacent satellites to the observation point and then to a second satellite adjacent to the first satellite; (b) the second then subsequently, after receiving a signal from the first satellite, in turn, transmits a new synthesized signal including the reference signal in the received synthesized signal and a time signal designating a time at the satellite, to the observation point and then to the third subsequent satellite. Similarly, the third satellite, upon receiving the signal from the second, transmits the time and reference signals to the observation point and then to the fourth satellite. Finally, the fourth satellite, upon receiving the signal from the third, transmits such a new synthesized signal to the observation point; (c) the times of reception of the signals transmitted from the four satellites to the observation point are determined at the observation point; (d) the positions of the four satellites are calculated by using the determined times and estimated values of the orbit parameters of the satellites within the geosynchrous orbits obtained from a control station on the earth; and (e) three hyperboloids each placing the foci on adjacent two of the calculated positions of the four satellites are determined, whereby the position of the observation point is determined as an intersecting point of the hyperboloids.

Each of the satellites of this embodiment comprises a clock means calibrated by a command signal sent from the control station, a means for generating a reference signal for range measurement, a means for producing a synthesized signal by synthesizing outputs from the clock means and the generating means, a means for transmitting the synthesized signal to the observation point and an adjacent satellite, and a means for transmitting the received synthesized signal to the observation point and an adjacent satellite.

The command signal is produced on the basis of the time signal contained in the synthesized signal received by the observation point, the orbit and predicted positions of the four satellites and the standard time.

In a further embodiment of the invention, four satellites are disposed on geosynchronous orbits having the orbit inclination angle of substantially 6 degrees with respect to the equitorial plane such that a sequence of first, second and third satellites are disposed to be simultaneously in the range of vision of the observation point and that th anomalies of the three satellites are separated from one another substantially at an angle of 120 degrees (a) a synthesized signal including a time signal designating a transmission time and a reference signal synchronized with the time signal is transmitted from the first satellite to an observation point on the earth and to the second satellite; (b) the second satellite transmits synthesized signal including the reference signal in the received synthesized signal and a time signal designating a time at the satellite, to the observation point and the third satellite, and the third satellite transmits such a new synthesized signal to the observation point; (c) the above steps (a) and (b) are repeated after the lapse of a period having a significance to detecting the positions of the three satellites; (d) the times of reception of the signals transmitted from the three satellites in the above steps (a) and (b) are determined at the observation point; (e) the positions of the three satellites when they perform the operations in the steps (a) and (b) are calculated by using the determined times and estimated values of the orbit parameters of the satellites within the geosynchronous orbit obtained from a control station on the earth; and (f) three hyperboloids are determined each placing the foci on adjacent two of the calculated positions of the three satellites, whereby the position of the observation point is determined as an intersecting point of the hyperboloids, Each of the satellites in this embodiment comprises a clock means calibrated by a command signal sent from the control station; a means for generating a reference signal for range measurement, a means for producing a synthesized signal by synthesizing outputs of the clock means and the generating means, a means for transmitting the synthesized signal to the observation point and an adjacent satellite, and a means for transmitting the synthesized signal from the preceding satellite to the observation point and an adjacent satellite.

The command signal is produced on the basis of the time signal contained in the synthesized signal received by the observation point, the orbit and predicted positions of the respective satellites and the standard time.

In accordance with the present invention, as far as an observation point is not in the polar regions locating at high latitudes, an observer can calculate his own position using a simple clock and a receiver equipped with an algorithm for calculation processing.

Other objects and features of the present invention will more clearly be understood by those skilled in the art who read the following detailed description with reference to the accompanying drawings.

BRIEF DESCRIPTION OF THE DRAWINGS

FIG. 14 is an illustration explaining a method of calculating the mutual ranges among three satellites;

FIG. 15 is an illustration explaining a method of determining the mutual range between two satellites in consideration of their movements;

FIGS. 16(a), (b) and 17 are illustrations showing a signal transmission procedure among three satellites and between the respective satellites and the observation point in the first embodiment;

FIGS. 23(a), (b) and (c) are illustrations showing the structures of signals received at the observation point when a signal in the format of FIG. 21 reaches the observation point directly and through a satellite;

Throughout the figures, similar or like elements and components are designated by the same numerals and symbols.

DETAILED DESCRIPTION OF THE PREFERRED EMBODIMENT

Principle of Measurement

The principle of measurement for determining a position of a point on the earth using a plurality of satellites with first be described to give a better understanding of the present invention.

Figure 2:
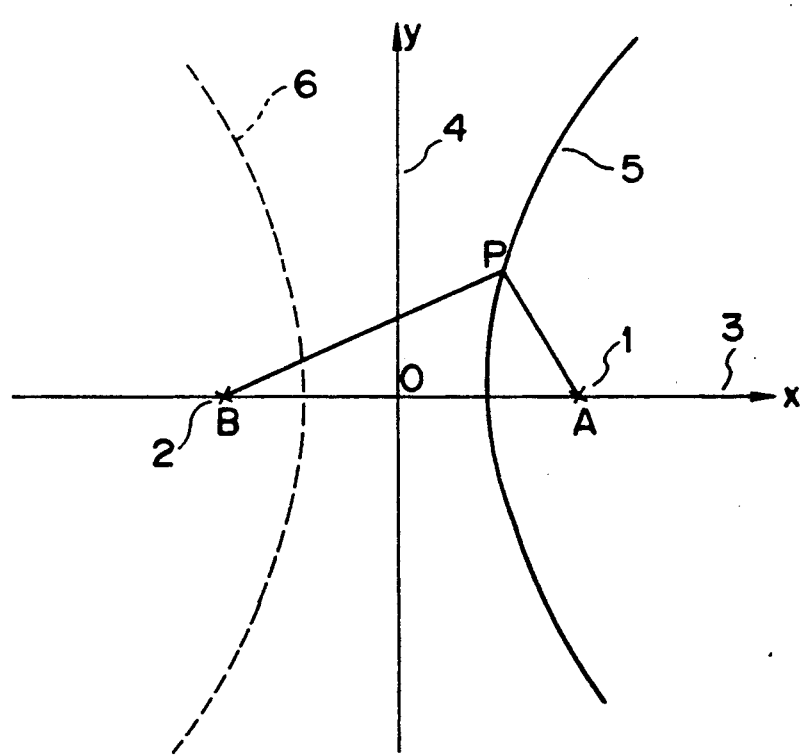
FIGS. 2 and 3 are illustrations for explaining a method of determining the position of an observation point using two satellites.

FIG. 2 illustrates how a two dimensional position is determined using two satellites. Let's assume that satellites 1 and 2 on a geosynchronous orbit are at points A and B, respectively. The reference numeral 3 is the x axis passing through these satellites; 4 the y-axis having its origin as the mid-point on the x axis between the satellites; P a point at which a difference between the ranges AP and BP is constant; 5 a hyperbola which is a locus of the point p on the x-y plane; and 6 another hyperbola symmetrical to the hyperbola 5 in respect to the y axis.

The hyperbolae on the x-y plane are expressed by the following formula:

$$\frac{x^2}{a_1^2} - \frac{y^2}{b_1^2} = 1 \qquad (1)$$

where, the focus f and the eccentricity e are expressed as follows:

$$f = \pm a_1 e$$

$$e = \frac{(a_1^2 + b_1^2)^{\frac{1}{2}}}{a_1}$$

The difference between the ranges AP and BP, $d = 2a_1$.

Figure 1:
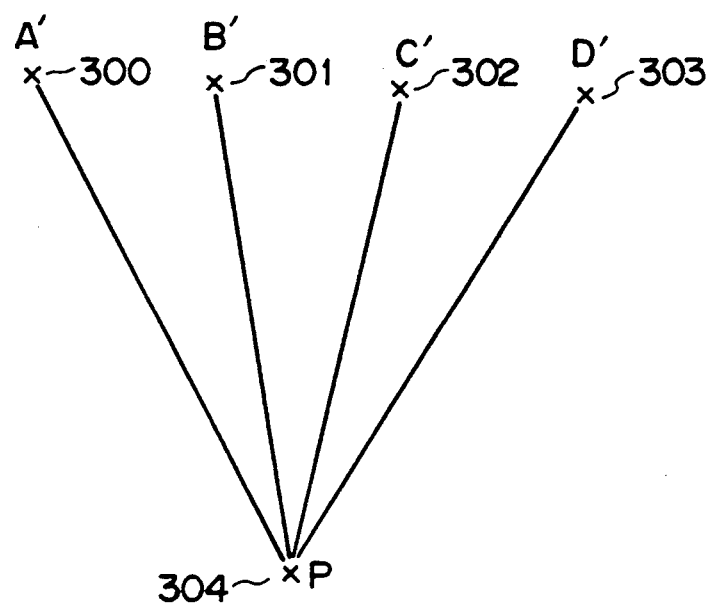
FIG. 1 is an illustration showing the disposition of satellites in a conventional GPS.

In the present invention, measurements are made on the different between the range between the satellite 1 and the observation point P and the range between the satellite 2 and the observation point P. With the arrangement of FIG. 1, the hyperbolae 5, 6 can be depicted by such range difference information. The observation point exists on either of the hyperbolae 5, 6, and it is possible to determine on which of the hyperbolae the observation point P exists if one obtains information on the relative length of the ranges AP and BP. In this instance, the observation point exists on the hyperbola 5.

Although the two dimensional case has been described with reference to FIG. 2, the real phenomena are three dimensional. A hyperboloid 7 as shown in FIG. 3 depicted by turning the hyperbola 5 about the x-axis will next be considered.

Figure 3:
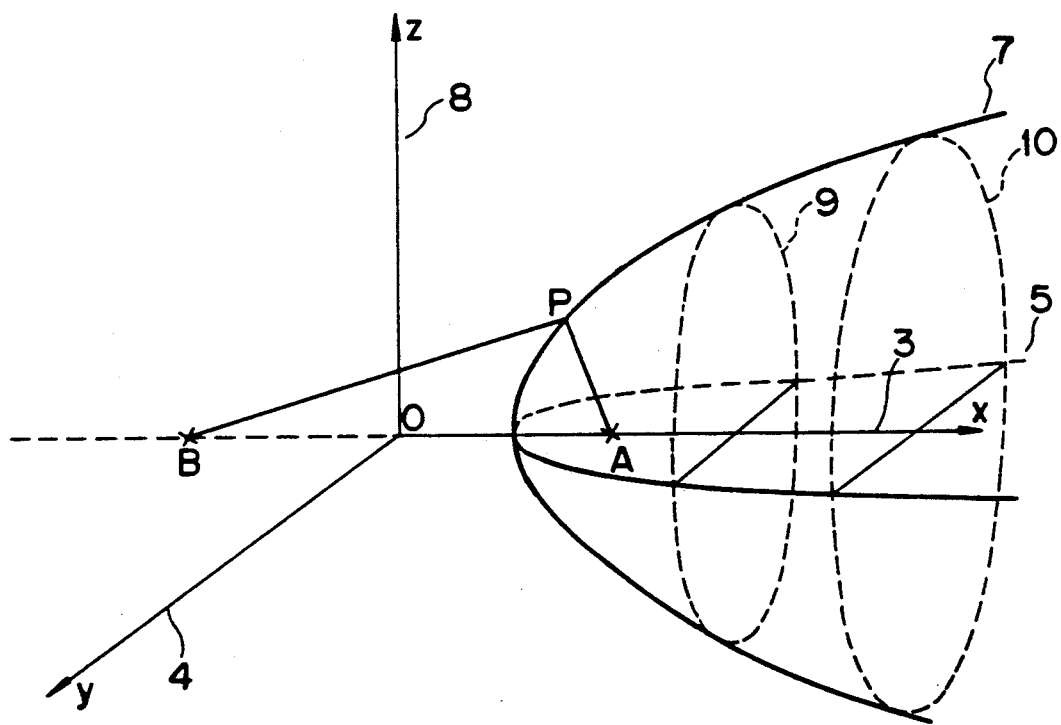

FIG. 3 illustrates the hyperbol in the x-y-z coordinate system. The reference numeral 8 is the x-axis; and 9 and 10 cross sections of the hyperboloid taken along planes, respectively, parallel to the y-z plane.

The hyperboloid 7 can be obtained by the following formula:

$$\frac{x^2}{a_1^2} - \frac{y^2 + z^2}{b_1^2} = 1 \quad (2)$$

In the case shown either in FIG. 2 or 3, if the point P is on the x axis, the hyperbola 5 and the hyperboloid 7 may become straight lines. However, such arrangement cannot exist because the satellites are on a geosynchronous orbit and the observation point is on the earth.

An example using three satellites will now be described by reference to FIG. 4. A further satellite 20 is added at a position C in another x'-y' coordinate system existing in the x-y plane of FIG. 2. The reference numeral 21 is the x'-axis passing through points A and C; 22 the y' axis passing through the mid-point between A and C; $\theta$ an angle formed between the x- and x'-axes; 23 a hyperbola depicted on the basis of the fact that the difference between the ranges AP and CP is constant; 24 and 25 points of intersection of the hyperbolae 5, 23; and 26 a straight line passing through the points 24, 25.

The observation point P exists at a location which satisfies the condition that the difference between the ranges AP and BP is constant and that the difference between the ranges AP and CP is constant. It is at two points, i.e., the intersecting points 24 and 25 where the same range difference ca be measured both on the hyperbolae 5 and 23.

Figure 4:
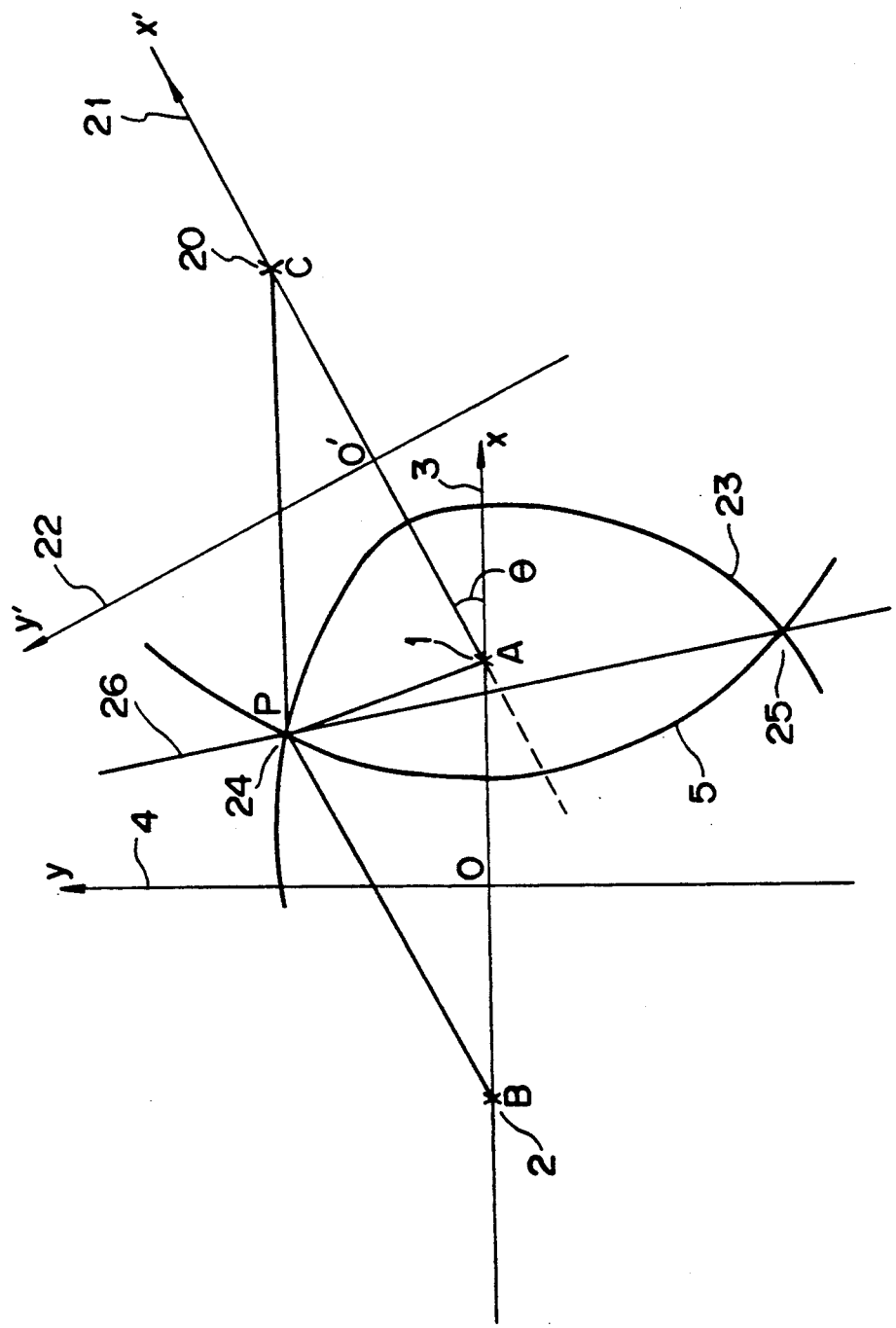
FIGS. 4 and 5 are illustrations for explaining a method of determining the position of an observation point using three satellites.

The phenomenon in the x-y and x'-y' planes which has been considered with reference to FIG. 4 will now be developed to a three dimensional phenomenon in x'-y'-z' coordinate system. The reference numeral 27 is a hyperboloid obtained by rotating the hyperbola 23 about the x'-axis; 28 a plane including a line segment passing through the intersecting points of the hyperboloids 7 and 27; 29 the z'-axis; and 30 a curve of secondary degree formed by the intersection between the hyperboloids 7 and 27.

The hyperboloids 7 and 27 in the x-y-z and x'-y'-z' systems are expressed by the following equations:

$$\frac{x^2}{a_1^2} - \frac{y^2 + z^2}{b_1^2} = 1 \quad (3)$$

$$\frac{x'^2}{a_2^2} - \frac{y'^2 + z'^2}{b_2^2} = 1 \quad (4)$$

The relation between the x-y-z and z'-y'-z' systems are as follows:

$$\begin{array}{c}x'\\y'\\z'\end{array} = \begin{array}{ccc}\cos\theta, & \sin\theta, & 0\\-\sin\theta, & \cos\theta, & 0\\0 & 0 & 1\end{array} \begin{array}{c}x\\y\\z\end{array} \begin{array}{c}-e_1a_1\sin\theta - e_2a_2\\+ e_1a\sin\theta\\0\end{array} \quad (5)$$

where $e = \left(\frac{a^2 + b^2}{a}\right)^{\frac{1}{2}}$ $e$: eccentricity

Since the x-y and x'-y' planes are on the same plane, $$= z' \quad (6)$$

When eliminating z from Equations (2) and (4) using Equation (6), $$\frac{b_1^2}{a_1^2} x^2 - \frac{b_2^2}{a_2^2} x'^2 - (y^2 - y'^2) = b_1^2 - b_2^2 \quad (7)$$

It is known from the hyperbola formula that the ratio of the length between a point on a hyperboloid and the focus to that length between the point on the same hyperboloid and the directrix is equal to the eccentricity. In the x-y and x'-y' planes shown in FIG. 4, the hyperbola 5 is in the first and fourth quadrants and the hyperbola 23 is in the second and third quadrants, thereby providing the following expression:

$$AP = |e_1x - a_1| = |e_2x + a_2| \quad (8)$$

If considering the sign in the case of FIG. 3, Equation (8) can be as follows:

$$e_1x - a_1 = -(e_2x + a_2) \quad (9)$$

Figure 5:
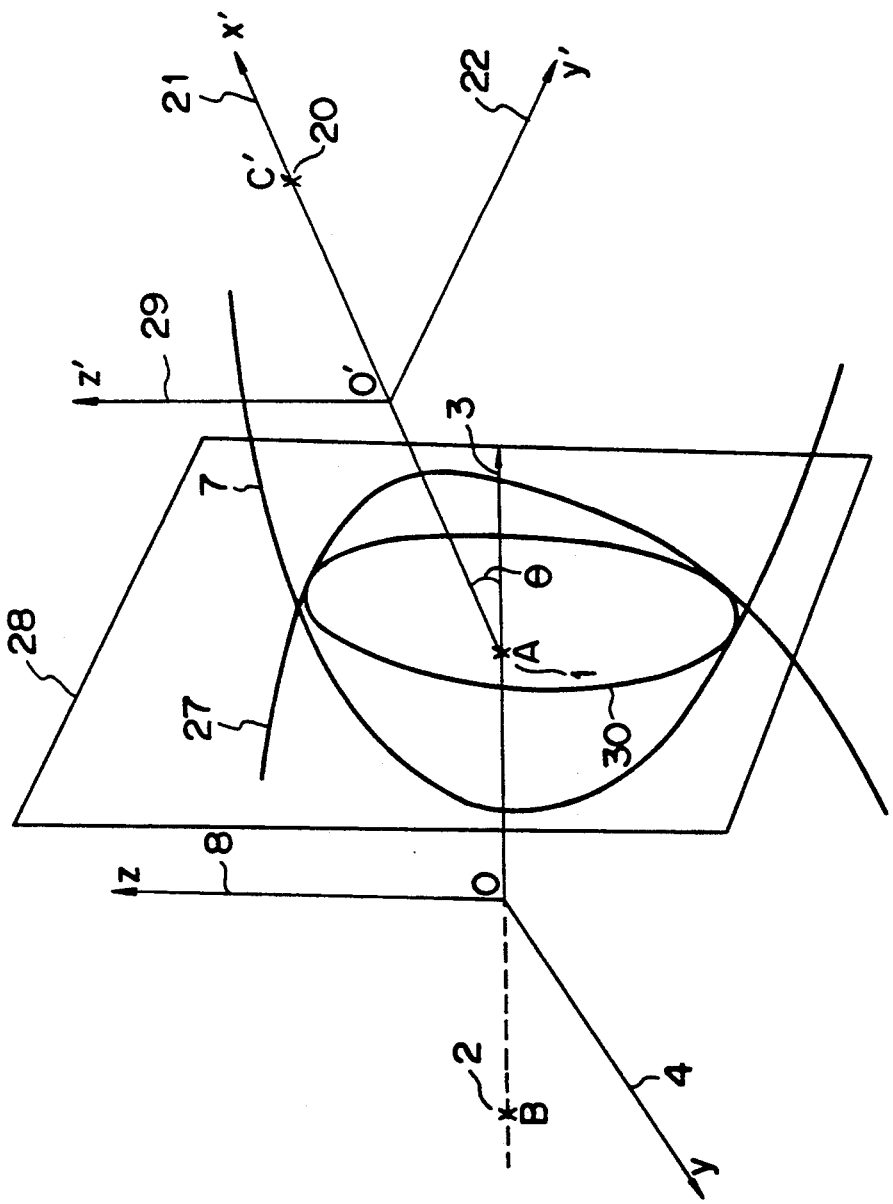

The relation expressed by Equation (9) is not only established in the x-y and x'-y' planes, but also in the hyperboloids of FIG. 5. When Equation (7) is substituted for by Equation (9) to develop an equation for obtaining the condition under which the hyperboloids intersect, the following linear equation can finally be obtained:

$$K_1x + K_2y + K_3 = 0 \quad (10)$$

where:

$K_1 = -2a_2(e_1 + e_2\cos\theta)$;
$K_2 = -2e_2a_2\sin\theta$; and
$K_3 = e_1^2a_1^2 + 2e_1e_2a_1\cos\theta + e_2^2a_2^2 - (a_1 - a_2)^2 - (b_1^2 - b_2^2)$ Equation 10 is independent of z and z', and there is a plane 28 parallel to the z and z' axes and common to the x-y-z and z'-y'-z' systems. The intersecting points 24, 25 of Equations (2), (4) are on the plane 28.

In the configuration of FIG. 5 using the three satellites, it is appreciated that the observation point P is on a circle or ellipse, a quadratic polynominal curve existing on the plane 28. If the altitude of the point P can be obtained as a known value from another system, the point P will be determined. However, three satellites are insufficient to determine the point P as one point from information of the difference between the ranges between the satellites and the observation point.

First Embodiment

Figure 6:
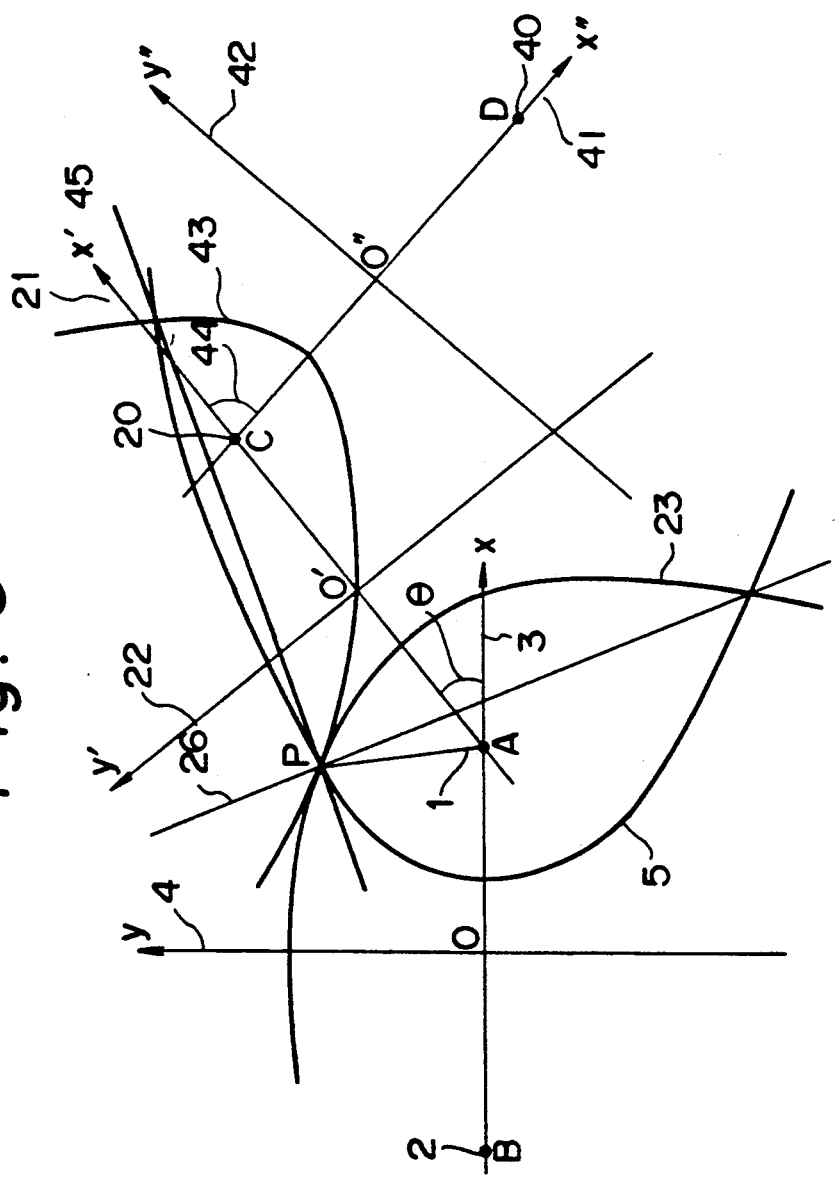
FIGS. 6 and 7 are illustrations of the first embodiment of a method of determining the position of an observation point using four satellites in accordance with the present invention.

FIG. 6 shows a method of determining a two dimensional position of a point on the earth using four satellites. The fourth satellite 40 is in a position D. The reference numeral 41 is the x"-axis passing through points C an D; 42 the y"-axis passing through the mid point between C and D; 43 a hyperbola placing the foci on position C of the satellite 20 and position D of the satellite 40; 44 an angle between the x' and x" axes; and 45 a line passing through the intersecting points of the hyperbolae 5 and 43.

As a result of adding the new x"-y" coordinate system and the new satellite 40 to the system shown in FIG. 4, a constant difference between the ranges between a point and the satellites 20, 40 can be observed, and thereby the hyperbola 43 is depicted. The line 45 passing the intersecting points of hyperbolae 5 and 43 can be obtained, which enables the point P to be determined at the intersecting point of two lines 26, 45. In the two-dimensional plane, the observation point can be determined as the junction of two lines using four satellites.

A similar concept can be applied to a three-dimensional system. This will now be described with reference to FIG. 7 in which the reference numeral 46 is the z"-axis of x"-y"-z" system, and 47 indicates a plane of intersection between the hyperboloid 7 and a hyperboloid formed by rotating the hyperbola 43 about the x"-axis.

As described in respect to FIG. 5, the plane 28 can be depicted on the basis of the position of the satellites 1, 2, 20 in the x-y-z and x'-y'-z' systems, and the plane 47 can also be depicted on the basis of the positions of the satellites 1, 20, 40 in the x-y-z, x'-y'-z', and x"-y"-z" systems. The observation point exists on a quadratic polynominal curve 48 common to the two planes 28 and 47, and also at a point of intersection of these two planes.

Figure 7:
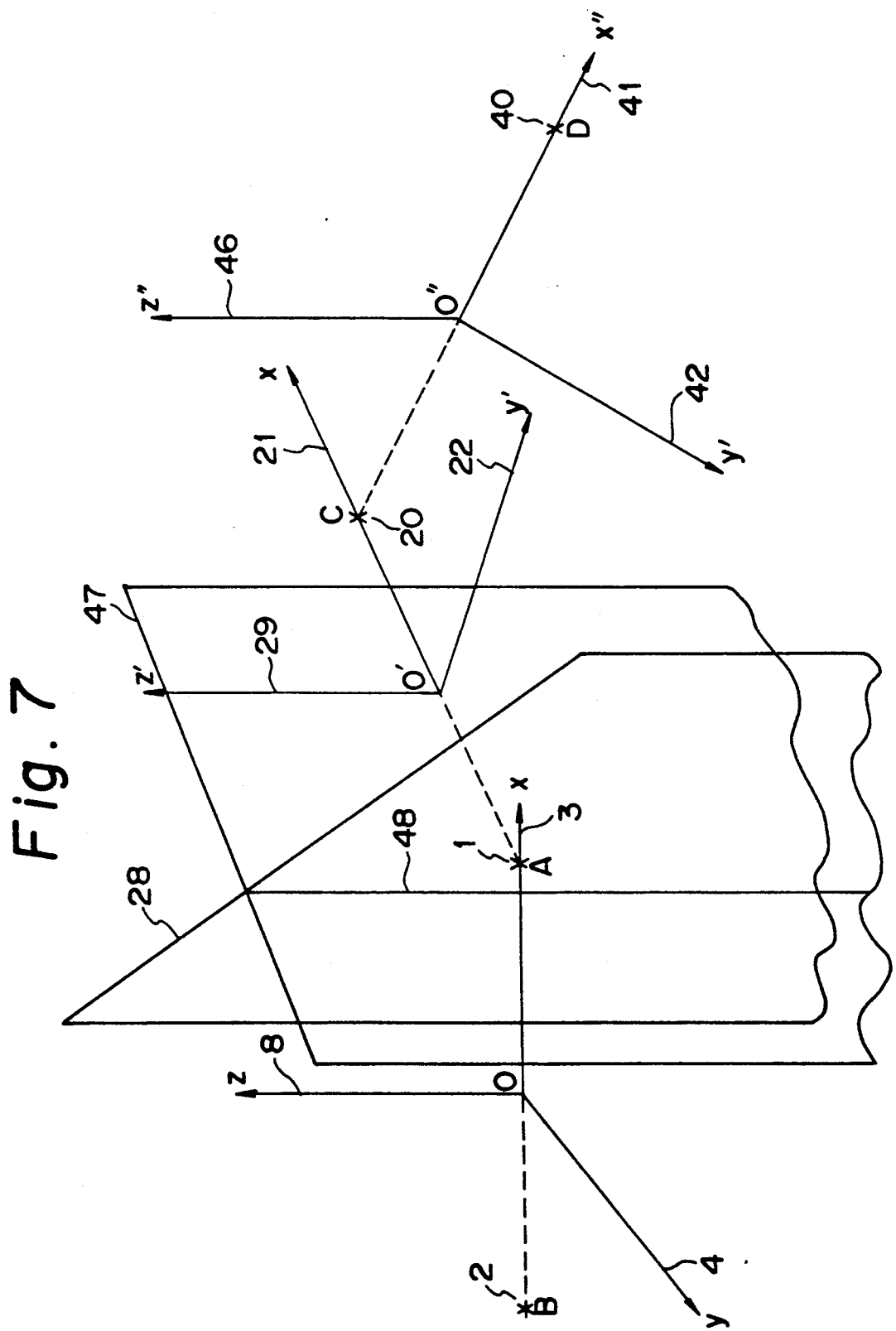

The plane in which the point P exists can be obtained algebraically using Equation (10), but in the case of FIG. 7, it is difficult to obtain the point P using any algebraic expression, and so the characteristic solution is obtained by numerical analysis.

Figure 8:
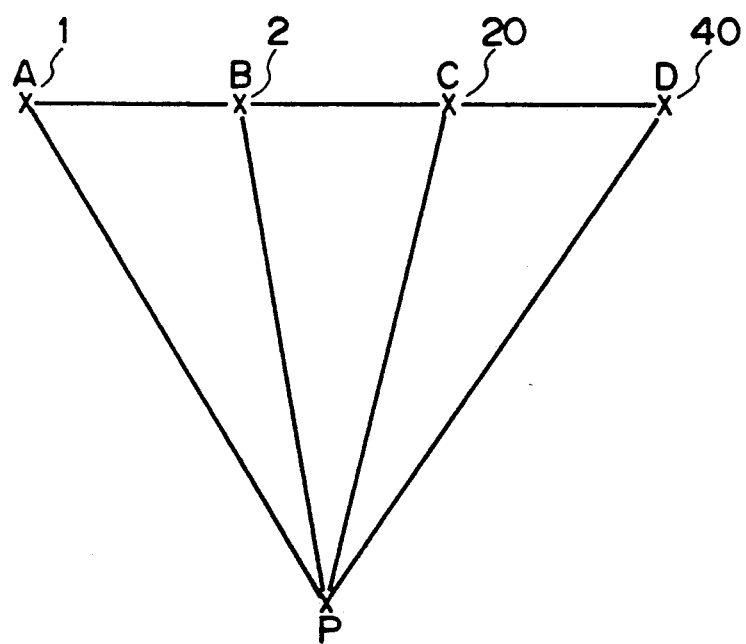
FIG. 8 is an illustration diagrammatically showing the disposition of the four satellites and the observation point in the first embodiment.

The dispositions of the satellites 1, 2, 20, 40 and the observation point P is shown in FIG. 8. The positions A, B, C, D of the satellites 1, 2, 20, 40 and the point P are indicated by the following coordinates:

$$A(x_A, y_A, z_A) \quad (11)$$
$$B(x_B, y_B, z_B)$$
$$C(x_C, y_C, z_C)$$
$$D(x_D, y_D, z_D)$$

$$P(x, y, z) \quad (12)$$

The coordinates of the point P are unknown numbers to be obtained. The values to be observed are the following three:

$$\begin{aligned} AP - BP &= S_1 \\ BP - CP &= S_2 \\ CP - DP &= S_3 \end{aligned} \quad (13)$$

Based on Equation (13), the following difference equation is obtained;

$$\begin{aligned} f(x, y, z) = &[(x - x_A)^2 + (y - y_A)^2 + (z - z_A)^2]^{\frac{1}{2}} - \\ &((x - x_B)^2 + (y - y_B)^2 + (z - z_B)^2)^{\frac{1}{2}} - S_1]^2 + \\ &[((x - x_B)^2 + (y - y_B)^2 + (z - z_B)^2)^{\frac{1}{2}} - \\ &((x - x_C)^2 + (y - y_C)^2 + (z - z_C)^2)^{\frac{1}{2}} - S_2]^2 + \\ &[((x - x_C)^2 + (y - y_C)^2 + (z - z_C)^2)^{\frac{1}{2}} - \\ &((x - x_D)^2 + (y - y_D)^2 + (z - z_D)^2)^{\frac{1}{2}} - S_3]^2 \end{aligned} \quad (14)$$

The function f(x, y, z) has a single minimum value at the point P. In order to determine such point, calculation is repeatedly performed using the steepest inclination method and an initially predicted observation point as the initial value so that the minimum value for the point P can numerically be calculated.

Figure 9:
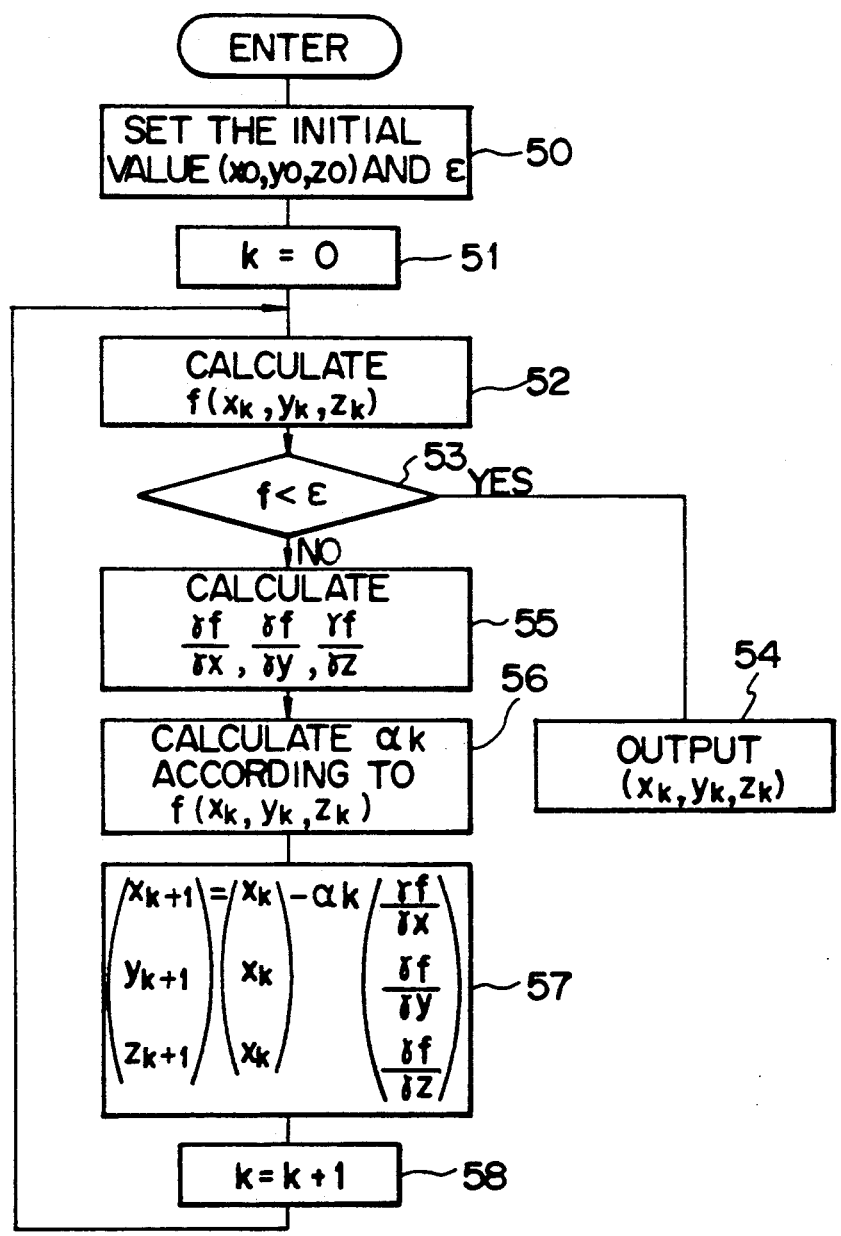
FIG. 9 is a diagram showing an algorithm for calculating the position of the observation point according to the present invention.

An algorithm of the numerical calculation is shown in FIG. 9. At the step 50, the initial value $(x_0, y_0, z_0)$ is set such that the value is not so much spaced away from the observation point. In this case, a value is preset for ceasing the repeated calculation when the difference between the calculated value of the function f(x, y, z) and the value obtained by substitution with the observed values becomes minimal. At the step 51, the calculation is initiated from k=0. At the step 52, Equation (14) is calculated when $(x_k, y_k, z_k)$ At the step 53, $\epsilon$ is compared with the value calculated at the step 52, and if $f(x_k, y_k, z_k)$ is smaller than $\epsilon$, the repeated calculation is ceased, and $(x_k, y_k, z_k)$ is output at the step 54. At the step 55, the partial differentials of the x, y, z components are calculated to obtain the differential coefficients. At the step 56, a numerical value is calculated for determining the magnitude of movement when moving from the k-th point to the (k+1)-th point. This value is set such that a value $a_k$, indicating the rate of variation in the movement, varies with a large width while $f(x_k, y_k, z_k)$ has a large value, and takes a small width and converges to the extremal value when $f(x_k, y_k, z_k)$ approaches the extremal value. It is a useful measure to search the external value by calculating the values of Equation (14) before and after the point $(x_k, y_k, z_k)$. At the step 57, $a_k$ is multiplied by the differential coefficients calculated at the step 54 to obtain the amount of movement of the respective components. Since the differentiated value in the direction existing the extremal value has a larger value, the vector value consisting of the three components can approach the extremal value by way of the shortest path when k is replaced with (k+1). $(x_k, y_k, z_k)$ minus the k-th amount of movement is newly set as $(x_{k+1}, y_{k+1}, z_{k+1})$. At the step 58, k is incremented by 1. The calculation is repeated until the decision condition at the step 53 is attained, and when exceeding the decision value, $(x_k, y_k, z_k)$ is obtained as an output.

The positions of the satellites on the orbits will now be described. The satellites are on geosynchronous orbits in wider interpretation and the present invention employs an orbit inclination angle larger than the small angle (for example, 0.05 degrees) employed in ordinary geostationary satellites. With this, it can be avoided that three or more of the satellites align at the same time.

Figure 10:
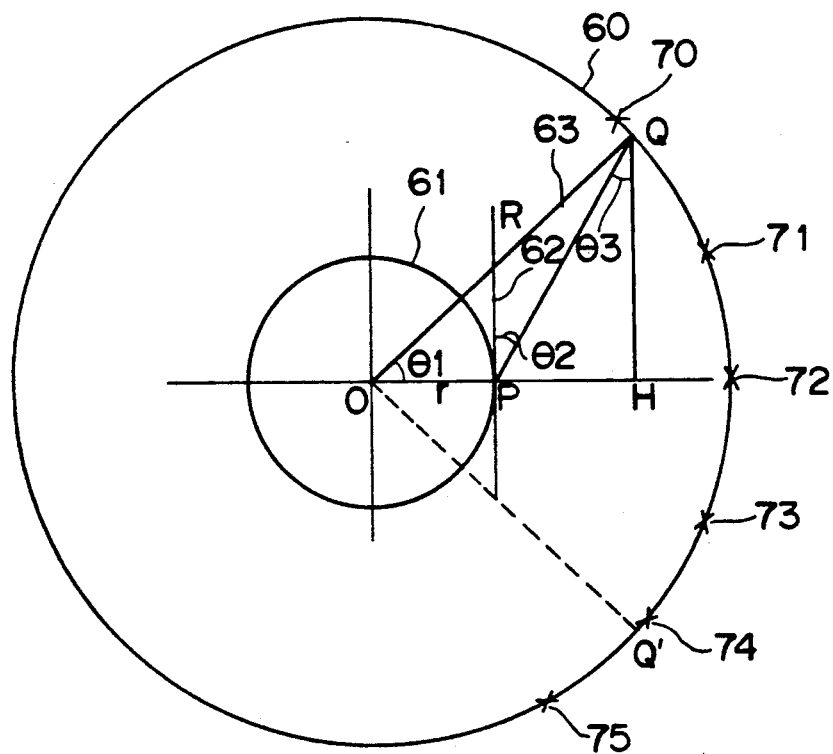
FIG. 10 is an illustration showing the positional relationship projected in the equitorial plane between the range of vision of the observation point and the satellites disposed on geosynchronous orbits in the first embodiment.

In the present invention, it is necessary that at least four satellites are always visible from the observation point. They are desirably at higher angles of elevation so that the range of vision is not obstructed by a building or the like, but this causes the number of satellites to increase. FIG. 10 shows a state of satellites on geosynchronous orbits. When viewed from a point about the north pole of the earth 61, the satellites are seen as if they are arranged on a single geosynchronous orbit 60.

The reference numeral 62 is the horizon at the observation point P; and 63 is a line extending through the earth's center 0 and the geosynchronous orbit and intersects the orbit 60 at a point Q. The angle of elevation at the point P is designated by $\theta_2$; the angle between OP and OQ by $\theta_1$; the normal line from Q by H; the angle between PQ and QH by $\theta_3$; and the radius of the earth by r. The reference numerals 70, 71, 72, 73, 74 and 75 are satellites on the geosynchronous orbit 60.

With respect to $\Delta$PQH, the following equation is obtained:

$$\tan\theta_3 = \frac{R\cos\theta_1 - OP}{R\sin\theta_1} \quad (15)$$

Since QH and the horizon 62 are parallel to each other, the angle of elevation can be obtained by $\theta_2 = \theta_3$.

Table 1 shows the relation between the angle of elevation and the number of satellites in the case where four satellites are between OQ and OQ' (Q' being the symmetrical point of Q) that is, in the visible range of the observation point. If the angle of elevation is about 9 degrees which may be an appropriate value, then the number of satellites needed is 10.

TABLE 1

| Angle of Elevation | Number of Satellites |
|---|---|
| 1.3 degrees | 9 |
| 9.3 degrees | 10 |
| 16.1 degrees | 11 |

The orbit inclination angle will now be described. It is necessary to select the orbit inclination angle so that the latitudinal distance of the satellites from the equatorial plane is significant for measurements relative to the range between the satellites. If the orbit inclination angle is too large, however, the angle of elevation cannot be large in high-latitude area. The populated areas of the earth range almost between the north and south latitudes of 65 degrees. The relation between the angle of elevation and the orbit inclination angle at the latitude of 70 degrees is shown in Table 2.

TABLE 2

| Latitude | Angle of Elevation | Distance from Equatorial Plane (one side) |
|---|---|---|
| 70 degrees | 5 degrees | 5,689 km |
| 65 degrees | 5 degrees | 8,534 km |
| 65 degrees | 10 degrees | 4,759 km |

Figure 11:
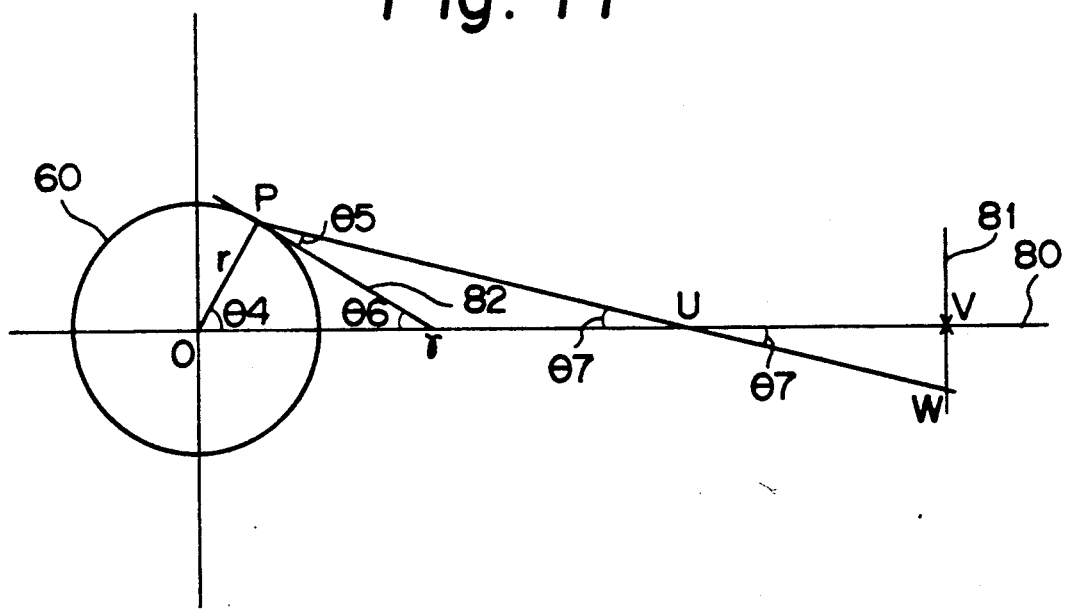
FIG. 11 is an illustration showing the orbit inclination angle of the geosynchronous orbit of the satellites in the first embodiment.

FIG. 11 shows the relation between the latitude and the satellite movement. The latitude of the observation point P is designated by $\theta_4$, and the angle of elevation as viewed from the point P by $\theta_5$. The reference numeral 80 is the equatorial plane; and 81 a line orthogonally intersecting the geosynchronous orbit existing on the equatorial plane 80. The horizon 82 and the equatorial plane 80 intersect at T; the equatorial plane 80 and a line forming the angle of elevation $\theta_5$ with respect to the line PT intersect at U; the equatorial plane and the geosynchronous orbit intersect at V; and the extension of the line segment PU and line 81 intersect at W.

When the latitude $\theta_4$ and the angle of elevation $\theta_5$ are given, the following angles are determined:

$\angle PTO = 90° - \theta_4 = \theta_6$ $\angle PUT = 180° - \theta_5 - (180° - \theta_6) = \theta_6 - \theta_5 = \theta_7$ When the sine rule is applied to $\Delta$PUT, $$TU = \frac{TP}{\sin\theta_7} \cdot \sin\theta_5 = \frac{r\tan\theta_4}{\sin\theta_7} \cdot \sin\theta_5 \quad (16)$$

Further, $$UV = 42,000 - TU - \frac{r}{\cos\theta_4} \quad (17)$$

$\angle PUT = \angle VUW = \theta_7$ then $$VW = UV \tan\theta_7 \quad (18)$$

Table 2 shows the latitude of the observation point and the distance of the satellite from the equatorial plane when the satellite in the equatorial plane is viewed from the observation point in the due south or due north direction.

In the present invention, four satellites should be distributed on a plane when viewed from the observation point, and these satellites should not exist on the same line.

Figure 12:
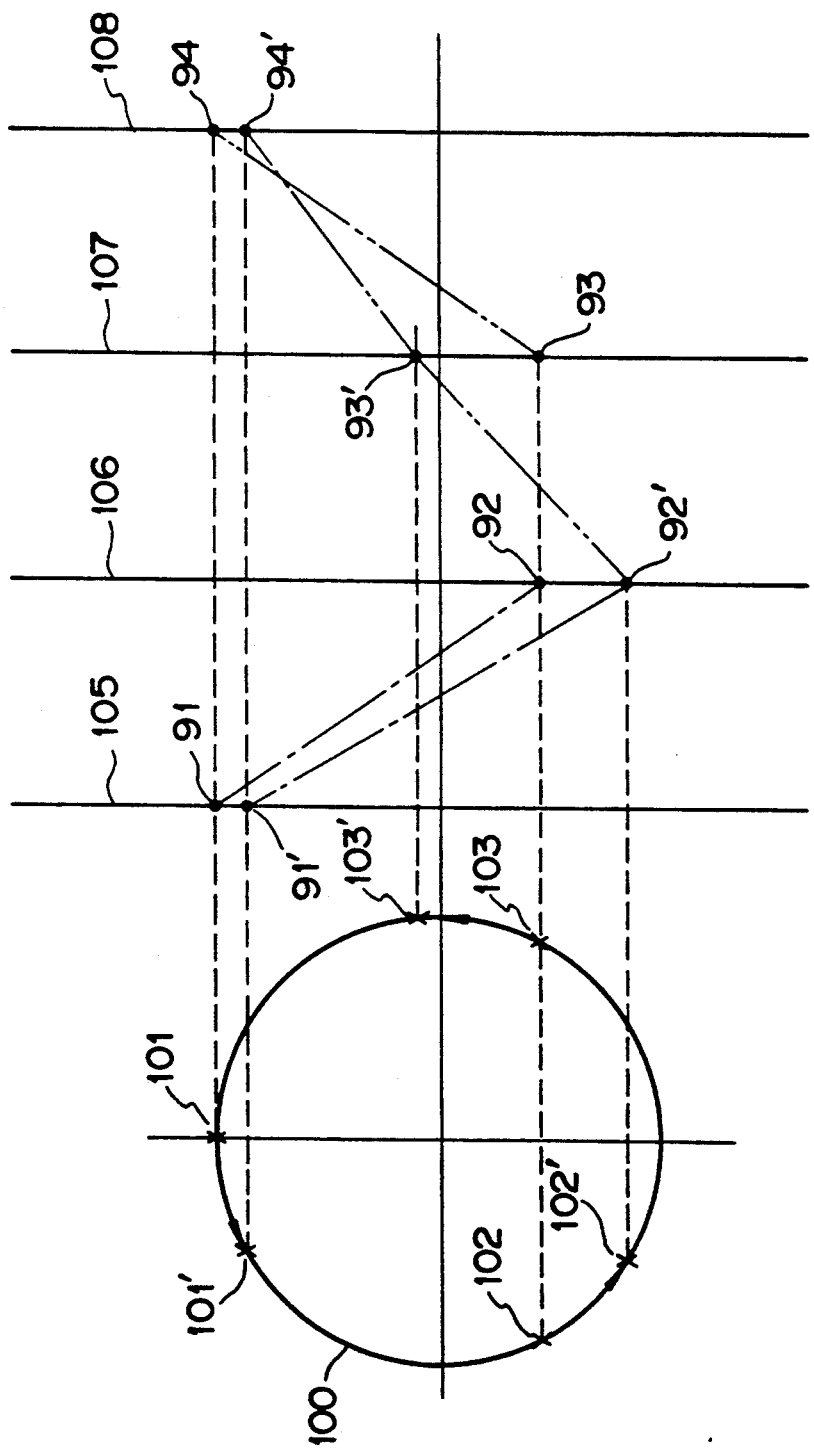
FIG. 12 is an abstract illustration showing the relative positions of four satellites on the geosynchronous orbits, the four satellite tracing figure eight loci and being simultaneously in the range of vision of the observation point in the first embodiment.

FIG. 12 shows the relative positions of four satellites on the geosynchronous orbits synchronously in the range of vision of the observation point, the relative positions being projected on the earth's surface.

At a certain time the four satellites are in positions 91, 92, 93, 94. These satellites are disposed such that the anomalies of the adjacent satellites are separated substantially 120 degrees at the same point of time. In other words, the positions of the satellites 91, 92, 93, 94 respectively correspond to points 101, 102, 103, on a circle 100. When a certain time has elapsed, the satellites move to positions 91'-94' which respectively correspond to points 101'-103'. The respective satellites depict loci 105-108. Although the loci 105-108 are shown in straight lines in the figure, the four satellites show in reality what is called the figure-eight characteristic.

In FIG. 12, the adjacent satellites are connected by dashed and dotted lines. The dashed and dotted lines appropriately bend and the four satellites distribute in a large area.

The present invention is based on measuring the difference between the range between two satellites themselves and between each of the satellites and the observation point. Exemplifying the satellites 1 and 2 of FIG. 8, the range difference between AP and BP is to be measured. For the purpose of measurement, the satellites 1, 2 generate signals at the same time, the signals are received at the observation point P and the difference in arrival time of the two signals are measured, thereby determining the above stated range difference. This method is practicable if the satellites 1, 2 have clocks indicating the same time. On the other hand, the present invention deals with a case in which the satellites have clocks indicating different hours. The signal generated by the satellite 1 reaches the observation point P directly and by way of the satellite 2. From the arrival times of such signals, the difference between AP and AB+BP is measured. AB can be calculated by inter-satellite communication or on the basis of the position of the two satellites. The subtraction of AB from the measured AB+BP allows the determination of the range difference between AP and BP.

A similar way of thinking can be expanded to the case of four satellites 1, 2, 20 and 40. The satellite 1 acts as a source and generates a signal which travels through the paths AP, ABP, ABCP, ABCDP to the observation point P and the time required for travel is roughly estimated for each path.

In the case of transmission of signal through the path of A-B-C-D-P, assume that the satellite range is 31,500 km [$=(26,400^2+(8.600\times 2)^{2\frac{1}{2}})$], and that there are four satellites on the geosynchronous orbits, each satellite being latitudinally spaced by 8,600 km away from the equatorial plane with a relatively large orbit inclination angle, and the satellites being spaced at the maximum distance. In practice, however, all the inter satellite ranges are not at the maximum. Then, the maximum value of the range ABCDP is shown below.

$$(ABCDP)_{max} = 31,500 \times 3 + 36,000 = 130,500 \qquad (19)$$

Since the velocity of light is approximately $3 \times 10^8$ m/sec, the time required for the signal to transmit through $(ABCDP)_{max}$ is given below.

$$\frac{130,500}{3 \times 10^5} \simeq 0.44 \text{ sec.} \qquad (20)$$

Figure 13:
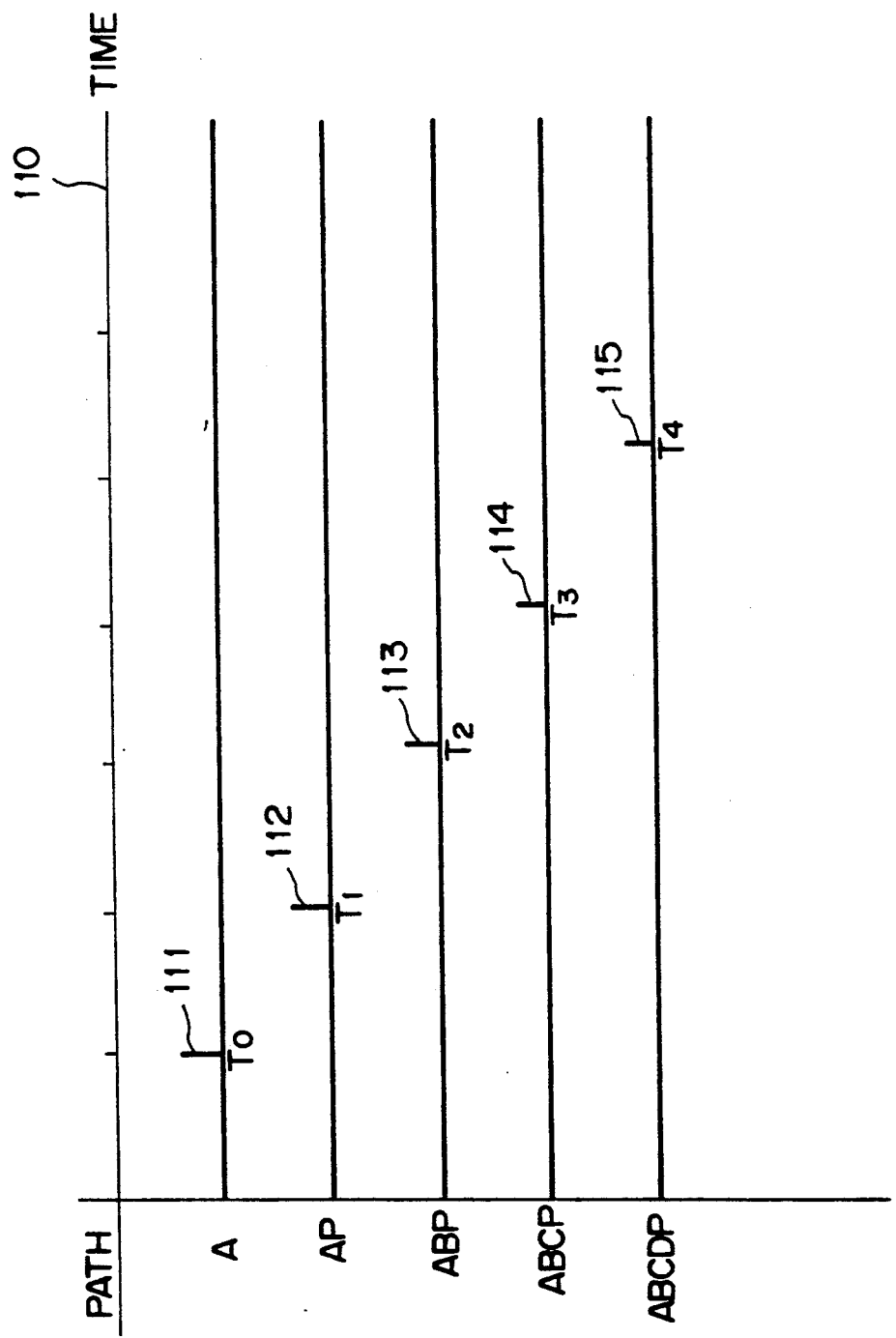
FIG. 13 is an illustration showing the times at which electrical waves transmitted from a satellite reach the observation point directly or by way of the remaining satellites in the first embodiment.

On the basis of the above described conditions, a method of determining the position of the observation point will be described with reference to FIG. 13. The abscissa shows the time and the ordinate shows paths. The satellite 1 generates a reference pulse 111 at time $T_0$, and the pulse is then received as a pulse 112 by the observation point P at time $T_1$. The reference pulse passing the satellite 2 is received by the point P as a pulse 113 at a time $T_2$; the reference pulse passing the satellites 2 and 20 is received by the point P as a pulse 114 at a time $T_3$; and a reference pulse passing the satellites 2, 20 and 40 is received by the point P as a pulse 115 at a time $T_4$.

The range differences required to calculate the hyperboloids for position detection are obtained as follows:

$$\begin{aligned}
|AP - BP| &= |AP - ABP - AB| \\
|BP - CP| &= |ABP - ABCP - BC| \\
|CP - DP| &= |ABCP - ABCDP - CD| \\
\text{where } |AP - ABP| &= (T_2 - T_1) \cdot C \\
|ABP - ABCP| &= (T_3 - T_2) \cdot C \\
|ABCP - ABCDP| &= (T_4 - T_3) \cdot C
\end{aligned} \qquad (21)$$

where, C is the velocity of light. Equation (21) means that three range differences can be determined if the range AB, BC, CD and the times $T_1$ to $T_4$ are measured, and that the point P can be determined as a point of intersection of three hyperboloids placing the foci on the points A and B, A and C, and C and D, respectively.

There is no need to provide any accurate clock at the observation point. When the satellite 1 generates the reference pulse 111 at a predetermined reference time $T_0$, for example, at an integral second time, the observer, who can roughly estimate the positions of the satellites, reads, with a clock having the accuracy of the order of 0.1 seconds, the reception times $T_1$, $T_2$, $T_3$ and $T_4$ of the reference pulses passing through the satellites 2, 20, 40 and accurately determines the time $T_0$ at which the reference pulse was initially generated. The observer can calibrate an ordinary clock by receiving time information on a standard time such as one supplied from JJY and obtains the absolute time with the accuracy of the order of 0.1 seconds. Thus, the measurements are performed between times $T_0$ and $T_4$, as shown in FIG. 13, and the measuring process can be completed for less than 1 second including a processing operation required. If the reference pulses are generated by the satellite 1 at the time intervals of 2 seconds, the time when the satellite 1 generates the reference pulses can be determined at the observation point P without uncertainty.

In order to determine the ranges AB, BC and CD, it is necessary that the positions of satellites on the orbit are precisely known. The control station is operable to measure the range of the satellites and the range rate. Accordingly, it is feasible to perform orbit determinations on the basis of the data obtained by the control station to decide the orbit, which enables the future positions of the satellites to be predicted. The predicted values of the orbit can be obtained as a function of time. Thus, when the times $T_0$ to $T_4$ are determined, the positions of the respective satellites are obtained and the ranges AB, BC, CD can be determined.

In the case ten satellites are seen to exist on the geosynchronous orbit 60 shown in FIG. 10, every three of them are grouped, and one of the satellites in one group first generates a reference signal at an integral-second time and a satellite in the subsequent group generates a reference signal integral seconds, such as one or two seconds, after the signal generation of the preceding satellite group. At the observation point P, necessary data can be obtained by observing four satellites of those in two groups. More specifically, the ten satellites a, b, c, d, e, f, g, h, i and j are grouped into four groups (a, b, c), (d, e, f), (g, h, i), and (j), and satellites a, d, g respectively generate reference signals at integral second times. The subsequent combination (b, c, d), (e, f, g), (h, i, j) and (a) is next formed. Four satellites of those in two groups, for example, (a, b, c), (b, c, d) are within the range of vision of the observation point P, and with the reception of the signals from these four satellites the position of the observation point P can be determined.

Alternatively, reference signals are generated by forming another combination (a, b, c, d), (e), (f, g, h, i) and (j). The satellites a and f generate reference signals at integral-second times and the adjacent satellites in each group b and g receive the signals from the satellite a or f and then transmit the received signal to the observation point P and the subsequent satellites c and h.

The position of the point P can be calculated on the basis of receiving signals from four satellites. Reference signals are then transmitted from the satellites b and g of a subsequent combination (b, c, d, e), (f), (g, h, i, j) and (a) at integral second times, and the combination of satellites is successively changed in order to enable different observation point to determine their positions.

The mutual range between the satellites can be calculated not by the orbit determination but by direct measurement of the position of the satellites. This will be described with reference to FIG. 14. With respect to the satellites 1, 2 and 20 at positions A, B and C, respectively, the following measurements are performed:

$$\alpha + \gamma - \beta = \delta_1$$

$$\gamma + \beta - \alpha = \delta_2$$

$$\alpha + \beta - \gamma = \delta_3$$

where the ranges between A and B, A and C, and C and B are designated by $\alpha$, $\beta$, $\gamma$, respectively. By solving Equations (22), the following equations are obtained:

$$\gamma = (\delta_1 + \delta_2)/2$$

$$\beta = (\delta_2 + \delta_3)/2$$

$$\alpha = (\delta_1 + \delta_3)/2$$

A device for measuring the inter-satellite range is mounted in each of the satellites 1, 2 and 20, and inter-satellite communication is performed between the satellites so that the ranges between them can be measured. More specifically, a signal is generated from the satellite 1. The satellite 20 receives the signal directly from the satellite 1 and the same signal coming by way of the satellite 2. The difference between the times of reception of these signals leads to the determination of the difference in range $\delta_1$. Such determination is performed by similar measurement of the respective satellites to determine $\delta_1$, $\delta_2$, $\delta_3$ of Equations (23). The measured values $\delta_1$, $\delta_2$, $\delta_3$ are transmitted as telemetry data to the observation point and the control station.

Since the ranges $\alpha$, $\beta$, $\gamma$ between the satellites are determined by solving Equations (23), the time required for the signal to propagate between two satellites can be calculated. This means that the time during which the reference signal passes through the respective satellites 2, 20 can be determined by the time at which the satellites 1 generated the signal, and the positions of the respective satellites can accurately be determined.

In this manner, the ranges AB, BC and CD of Equations (21) can be determined to allow accurate hyperboloids to be depicted.

It should, however, be noted that the ranges AB, BC, CD should be determined taking the movements of the satellites into consideration. This will be described with reference to FIG. 15 in which the reference numeral 120 is in the direction of movement of the satellite 1; and 121 the geosynchronous orbit of satellite 2. The position A and B of satellites 1 and 2 at a reference time $T_0$ can be determined by the orbit precision. At time $T_0$, the satellite 1 delivers a reference pulse to the satellite 2. Since the satellite 2 is moving on the geosynchronous orbit 121 as time passes, it receives the reference pulse from the satellite 1 at a point L. The time required for the satellite 2 to move from the point B to the point L is equal to the time required for the reference pulse to propagate from the satellite 1 to the point L. Thus, AL/C=difference between the time when the satellite 2 is at the point L and the time when it was at the point B, where C is the velocity of light.

Since only the point L satisfies such a condition, the point L and the distance AL can be determined. Although Equations (21) do not include any component relating to the movement of the respective satellites, when taking such movement into consideration, AL obtained should be used in place of AB.

On the basis of the above description, a procedure for determining the difference between the ranges between the satellite and the observation point will concretely be described. It is noted that each of the satellites is provided with a device for measuring the mutual distance, as described in reference to FIG. 14. FIGS. 16(a) and 16(b) show a procedure of signal transmission among three satellites and between the respective satellites and the observation point.

FIG. 16(a) shows one group consisting of three satellites 1, 2 and 20, the satellite 1 being a signal source, and FIG. 16(b) shows another group including satellites 42, 42' and 42" operable in the same way. The flow of signals of one group will be described with reference to FIG. 17.

From the satellite 1 at the position A, an original signal 141 (FIG. 17) is transmitted at time $T_0$ towards the observation point P through a path 130 and toward the satellites 2, 20 through paths 131 and 132. The reason why the satellite 1 sends the original signal to the satellites 2, 20 will be explained later. The observation point P then receives a signal 142 at time $T_{11}$. The signal generated by the satellite 1 and passing through the satellite 2 is transmitted through a path 133 and received as a signal 143 by the observation point P at time $T_{12}$. By measuring the time difference ($T_{12} - T_{11}$), the range difference ABP − AP can be determined as follows:

$$ABP - AP = C(T_{11} - T_{12}) \tag{24}$$

Since the range AB is determined by the estimated positions of the satellites 1, 2 or by actual measurements, the difference between AP and BP can be determined by subtracting AB from the result of Equation (24).

$$BP - AP = C(T_{11} - T_{12}) - AB \tag{25}$$

Similarly, the satellite 2 sends a signal through the path 133 to the observation point P and through paths 136, 137 to the satellites 2, 20, and the observation point P receives a signal 143 coming through the path 133 at time $T_{12}$ and a signal 144 passing through paths 137, 135 at time $T_{13}$. Thus, $$BP - CP - C(T_{13} - T_{12}) - BC \tag{25'}$$

The measurement of the mutual ranges among the satellites 1, 2 and 20 will now be described. As described above, the satellite 1 transmits the signals towards the satellites 2 and 20 through the paths 131 and 132. Then the satellite 2 transmits the received signal toward the observation point P through the path 133 and towards the satellite 20 through the path 134. The satellite 20 receives the signals at times $T_{14}$, $T_{15}$ and the time difference between $T_{14}$ and $T_{15}$ enables the difference between the paths of two signals ABC and AC to be measured:

$$ABC - AC = C(T_{15} - T_{14}) \tag{26}$$

$$\gamma + \alpha - \beta - \delta_1 \tag{27}$$

where $\delta_1 = C(T_{15} - T_{14})$.

With the signals passing through the paths 132, 137 and the signal passing through the path 131, the following relation is established:

$$ABC - AB = C(T_{17} - T_{16}) \tag{28}$$

$$\gamma + \beta - \alpha = \delta_2 \tag{29}$$

where $\delta = C(T_{17} - T_{16})$.

With the signals passing through the paths 136, 132 and the signal passing through the path 134, the following relation is also established:

$$BAC - BC = C(T_{19} - T_{18}) \tag{30}$$

$$\beta + \alpha - \gamma = \delta_3 \tag{31}$$

where $\delta_3 = C(T_{19} - T_{18})$.

Using Equations (27), (29) and (31), the ranges $\alpha$, $\beta$, $\gamma$ between the satellites are determined.

For the satellites 42, 42' and 42", the same measuring procedure as for the satellites 1, 2 and 20 can be applied.

In the arrangement of FIGS. 16(a) and 16(b), the satellites 1 and 42 operate as the origins of signals and transmit the signals at reference times.

Figure 17:
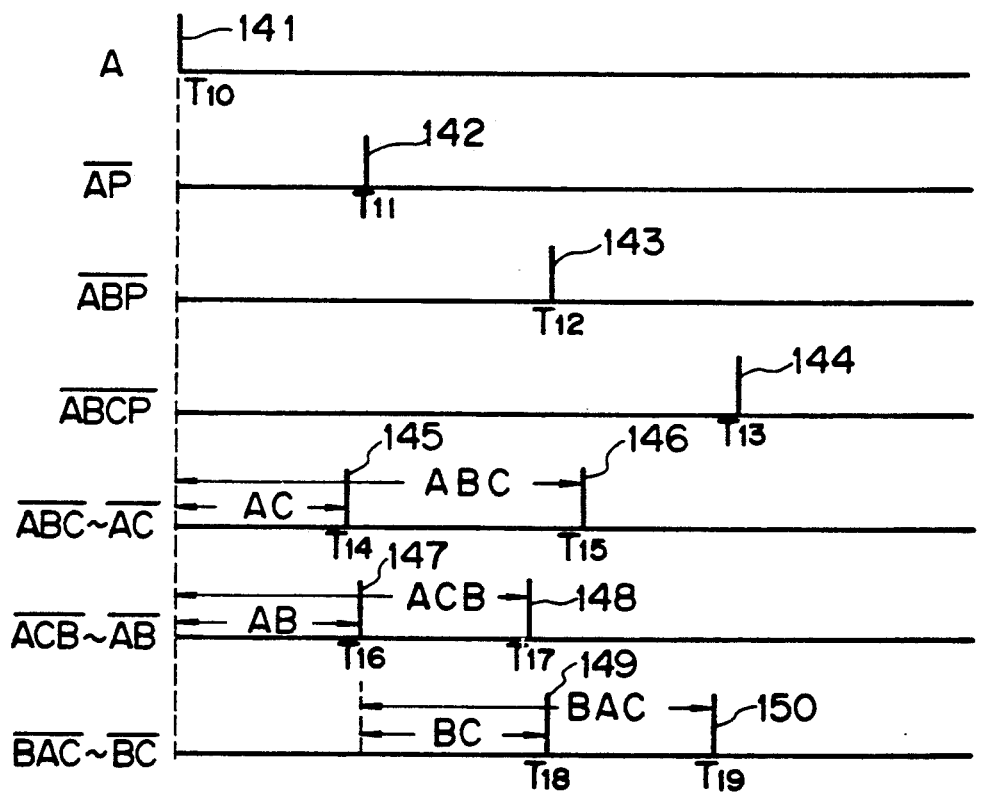
Figure 18:
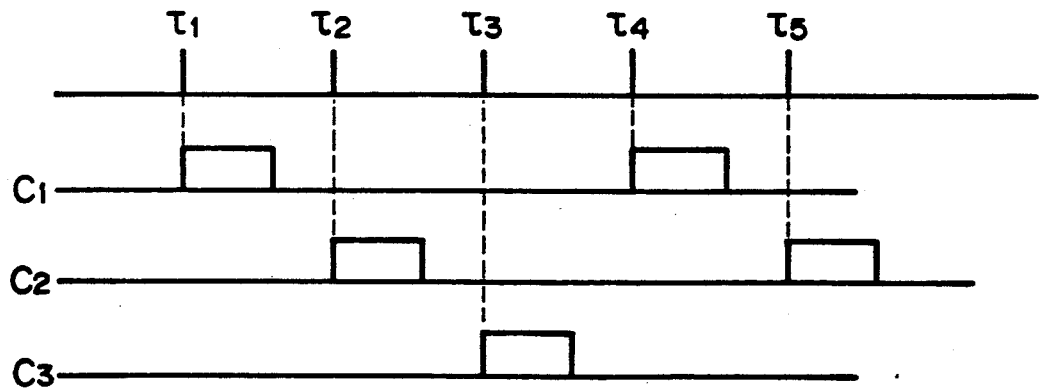
FIG. 18 is an illustration showing a procedure of sequentially calculating the range differences between the satellites and the observation point.

In case where there are, for example, ten satellites a, b, c, d, e, f, g, yh, i, and j on geosynchronous orbits, a combination $C_1$ of four satellite groups (a, b, c), (d, e, f), (g. h, i) and (j) is formed to make such measurement of time differences as described with reference to FIGS. 16(a), 16(b) and 17. The measurement of range difference is similarly made with respect to the subsequent combination $C_2$ (b, c, d), (e, f, g), (h, i, j) and (a). Thus different four groups are successively formed to make subsequent measurements. The observation point P makes the measurements with respect to the four satellites included in two groups, such as (a, b, c) and (b, c, d), and obtains all the information required to detect the position of the point P, FIG. 18 shows a procedure of sequential measurements of range differences on ten satellites grouped into four groups. At a time $\tau_1$, the period for a first measurement of range difference on four groups (a, b, c), (d, e, f), (g, h, i), (j) of the first combination $C_1$ is initiated and completed about 0.5 seconds from the time $\tau_2$. A third measurement on groups (c, d, e) (f, g, h) (i, j, a), (b) of the third combination $C_3$ starts at the time $\tau_3$ and continues for about 0.5 seconds. Such measurements are repeated in such an order as shown in FIG. 18.

As described above, the clock located at the observation point P is calibrated in accordance with the primary time standard of the country, such as JJY in Japan. Since four satellites, according to the present invention, are positioned in the range of vision of the observation point, it is feasible that the control station always observes the time at the respective satellites and precisely calibrates the clocks of the satellites.

Figure 19:
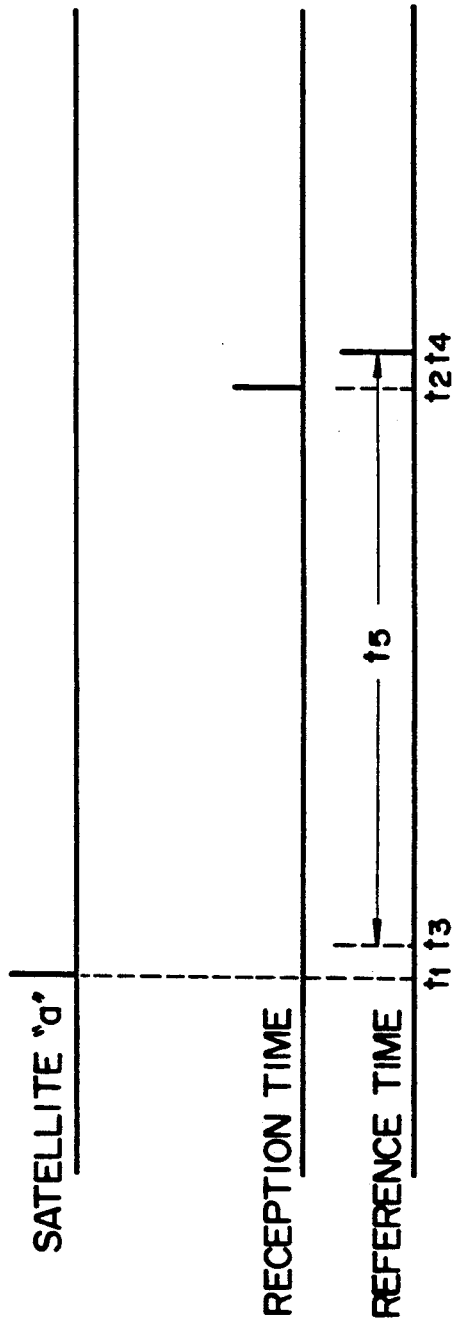
FIG. 19 is an illustration explaining a method of calibrating clocks equipped in the satellites by a control station on the earth according to the present invention.

Thus, the satellites can have highly precise clocks. Since the control station can know an accurate time from the primary time standard of the country, the time control can be achieved by cooperatively operating the primary time standard, control station and satellites. More specifically, a satellite sends to the control station a time signal indicating the current time at that satellite. The control station receives the time signal from the satellite, corrects the time signal using the time delay caused during the propagation of the signal and determined from the orbit information of the satellite possessed by the control station, and compares the corrected time signal with the time on the group system. In FIG. 19, it is assumed that a time signal indicating that the clock of the satellite a points to a reference time $t_1$ is received by the control station at a time $t_2$. In contrast, the clock of the control station points to the time $t_1$ at a time $t_3$ and the control station estimates, on the basis of orbit determination values, that the signal delivered from the satellite a at the reference time will be received at a time $t_4$. Thus, when the control station detects the time difference $t_4-t_2$, the station sends a command to the satellite a to cause the clock of the satellite a'' to be calibrated. With this, the satellite can have a highly accurate clock.

Such clock calibration does not need to be performed every time when the time signal comes from a satellite. Instead, the time difference may be successively detected over a certain length of time and stored, and when the stored value exceeds a predetermined value, the calibration is performed to the clock of the satellite. This will facilitate the detection of the time difference.

Since the clock mounted on the respective satellite is, as described above, precisely calibrated, the satellite can transmit to the observation point P a signal including information indicating the delivery time of the original signal. Thus, the observation point can obtain information necessary for measuring the range differences including the time of generation of the original signal, thereby determining the accurate positions of the respective satellites.

In the arrangements thus far described, pulses are transmitted between the satellites and the observation point and among the satellites. The range measurement using pulses has broadly been utilized in the radar art. If pulse generating equipment is installed on the group it is easy to generate pulses having high amplitudes, but most of such pulses can only reach up to at most about 1,000 km. In the cosmic space, however, the range of signal is extremely large, and, moreover instantaneously concentrating signal energy in a pulse-like shape for range measurement disadvantageously enlarges the size of the equipment. If a signal designating the time is transmitted over a long period of time and an apparatus with which detection of such a signal can be performed for a long period of time is adopted on a receiving side, the arrangement of equipment to be positioned in satellites can be simplified.

The maximum range of signal transmission required for measurement is about 130, 500 km, as obtained by Equation (19), and coding should be performed such that only one unambiguous code exists in this distance. If a basic signal block is of the frequency 1 MHz, about $0.43 \times 10^6$ repeated wave forms exist therein. If 20-bit shift register is used to generate the pseudo-random code (PRN code), $1 \times 10^6 (\simeq 2^{20} - 1)$ characteristic patterns can be formed. Alternatively, $1,023 \times 1,023 \simeq 1 \times 10^6$ characteristic patterns can be generated by allowing the phase of the PRN code generated from two 10-bit shift registers to be characteristic and using the gold code obtained by the logical module 2 addition. On the reception side, correlation between two signals having time differences is operated to measure a difference in phase between the two codes, or the range difference. This principle of measurement can be applied to the measurements of ranges between the observation point and a satellite as well as between satellites. Such measurements will be made by a method using pulses if a laser communication is developed further. Using the PRN code will bring about advantages in that a plurality of different PRN codes, though having the same frequency, can simultaneously be used, and that the power density required in view of the electric wave interference can easily be maintained.

It is possible to obtain full information of the range difference for determining the position of the observation point P by using the above-described PRN code and causing each satellite to simultaneously transmit a range measurement signal and a time signal to the observation point and a subsequent satellite.

This will be described with reference to FIG. 20 which is a block diagram showing the arrangement of a transmitter mounted in a satellite for simultaneously transmitting the range measurement signal and the time signal. In this figure, the reference numerals 160 and 161 are shift registers for generating PRN codes for range measurement; 162 a time signal generator; 163 a timer device; 164 a carrier wave generator; 165 a clock signal for controlling the timing of generation of the PRN codes and the time code; 166 a reset signal for resetting the registers 160, 161 and 162 simultaneously or separately at integral-second times; 167 a MOD-2 adder of two codes; 168 and 169 modulators; 170 a 90-degree phase shifter; and 171 a synthesizing circuit for generating a QPSK signal.

The clock for the PRN codes is of 1 MHz, for example. The two PRN codes are MOD-2 added by the adder 167 to produce a new PRN code. The reason for the necessity of the range measurement signal generated by synthesizing the two PRN codes was described above. The modulator 168 modulates the carrier with the new PRN code to produce a BPSK (Bi-phase shift keying) modulation signal.

The content of the PRn codes is reset to zero at an integral-second time and changes from that time. The time signal generator 162 delivers to the modulator 169 a time signal under the control of the clock signal 165, the time code signal indicating the current time read from the timer device 163 when the reset signal 166 is input. With the time signal, the modulator 169 modulates the carrier having the phase 90 degrees different from that of the range measurement signal. The range measurement signal and the time signal, which are orthogonally modulated, are synthesized by the synthesizer 172 to form a single QPSK signal. Thus, the observation point P can, when receiving the QPSK signal, determine the time of signal generation.

Figure 20:
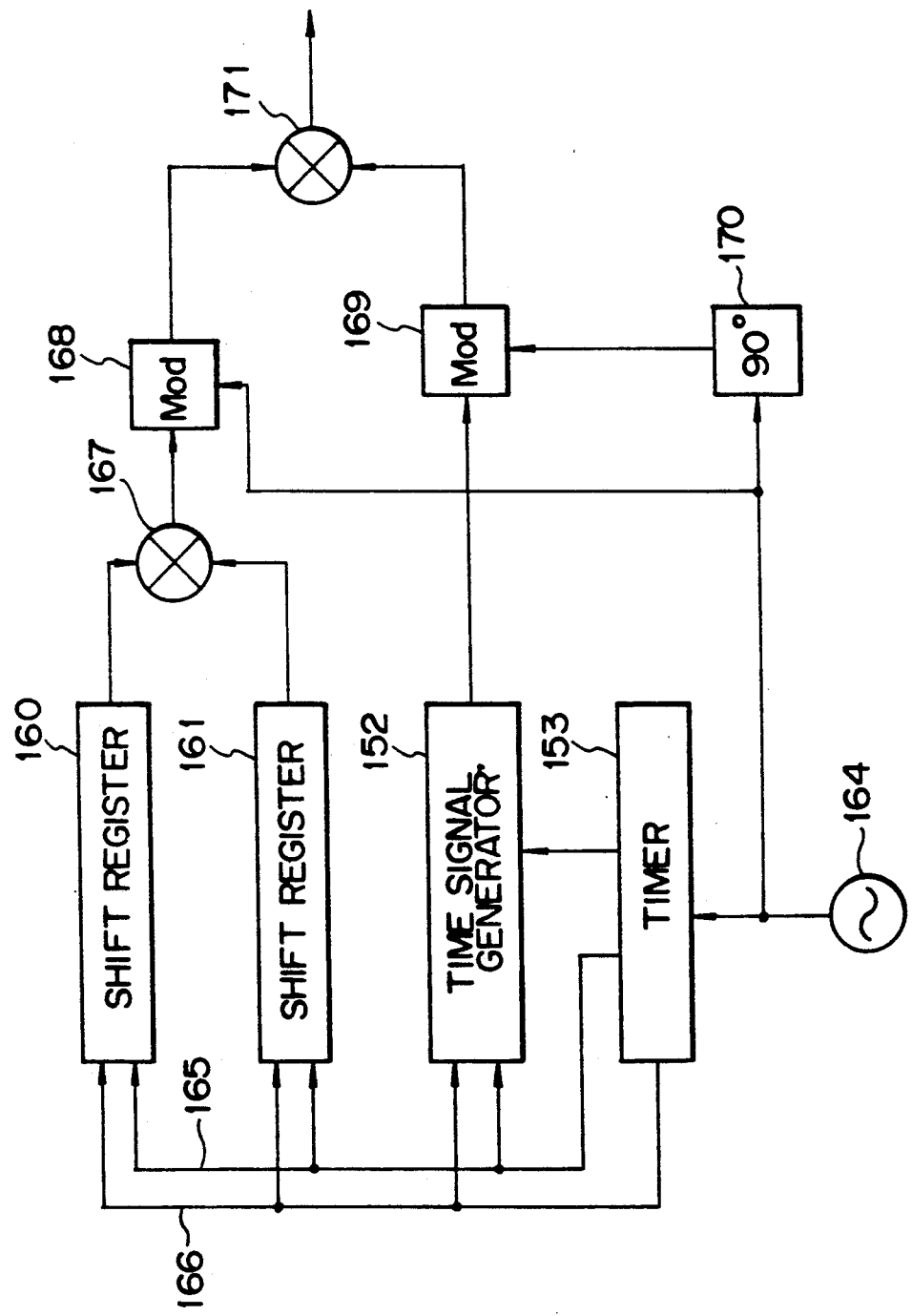
FIG. 20 is a block diagram showing the arrangement of a transmission section equipped in the satellites according to the present invention.
Figure 21:
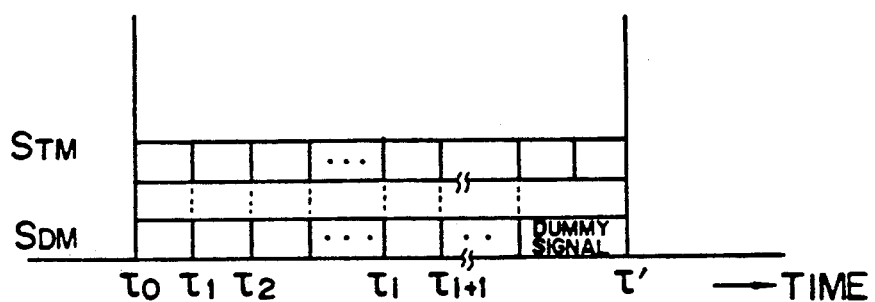
FIG. 21 is an illustration of the format of a signal transmitted from the transmission section of FIG. 20.

FIG. 21 shows a format of the signal transmitted from the transmitter of FIG. 20. The time signal STM and the range measurement signal $S_{RM}$ continue from an integral-second time $\tau_0$ at which the reset signal 166 is input from the timer device 163 to a time T' when a relatively short period has elapsed from the time $\tau_0$.

The time signal generator 162 is zero cleared at the time $\tau_0$ and the time count is started at that time. The time signal $S_{TM}$ includes a plurality of time codes which designate the time $\tau_0$ and the times $\tau_1, \tau_2, \ldots, \tau_i$, taken at predetermined intervals of time after $\tau_0$. The range measurement signal $S_{RM}$ includes a sequence of PRN codes which are zero cleared at the time $\tau_0$.

As will be apparent from FIG. 21, the range measurement signal $S_{RM}$ is accompanied by the time signal $S_{TM}$ so that the observation point P can determine the time of transmission of that range measurement signal.

Signal $S_{TM}$ and $S_{RM}$ are zero cleared at intervals of several seconds or of (an integer +0.5) seconds. If the range measurement signal is shorter than the time signal, a dummy signal is inserted after the end of the last distance measurement signal, as shown in FIG. 21.

Figure 22:
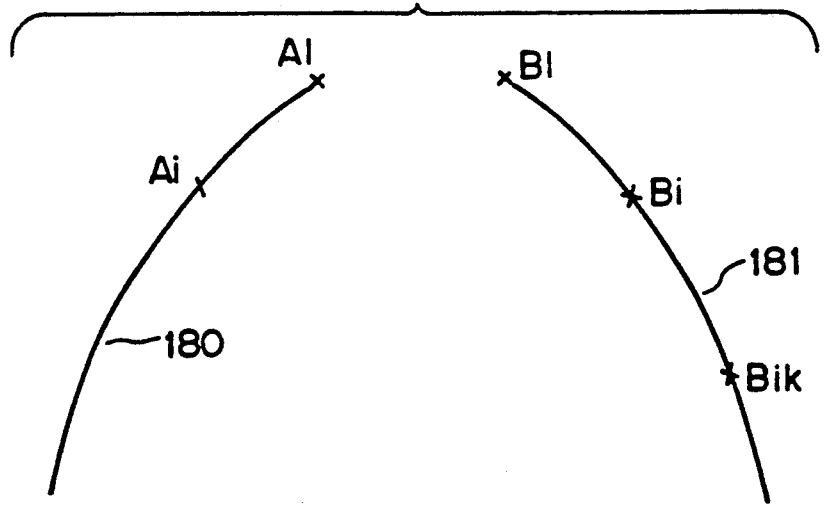
FIG. 22 is an illustration showing the movements of two satellites on the geosynchronous orbits.

Signals transmitted between two satellites and between them and the observation point will concretely be described with reference to FIGS. 22 and 23(a)-23(c). In FIG. 22, satellites a and b are moving to depict loci 180 and 181, respectively, and it is assumed that the satellites a and b are at their positions $A_1$ and $B_1$, respectively, at the time $\tau_0$ (FIG. 21).

At the time $\tau_0$, the satellite a begins to transmit an original signal $S_A$ to the satellite b and the observation point P, and thereafter continues the signal transmission. The satellite a reaches a position Ai at a time $\tau_i$. The original signal $S_A$ therefore comprises a time signal $S_{TM}$ including a series of time codes designating the times $\tau_0, \tau_1, \tau_2, \ldots, \tau_i, \ldots$, and a range measurement signal $S_{RM}$ including a sequence of PRN codes and a dummy signal. The observation point P begins to receive the original signal $S_A$ as a signal $S_{AP}$ at a time after the transmission delay $d_1$ between $A_1$ and P, from the time $\tau_0$. Accordingly, the delay $d_1$ corresponds to the difference between the time to an the time when the signal $S_A$ reaches the observation point P directly from the position $A_1$. On the other hand, the original signal $S_A$ which was transmitted rom the satellite a at the time $\tau_0$ is received by the satellite b at a position $B_1$, and then the received signal is transmitted to the observation point P. The satellite b operates such that it transmits to the observation point P the range measurement signal $S_{RM}$ of the received original signal $S_A$ as its own signal, but that a time signal generated by the satellite b replaces the time signal $S_{TM}$ of the received signal $S_A$ and is then transmitted to the pint P. Thus, the signal sent by the satellite b is received by the observation point P as a signal $S_{ABP}$ at a time after the transmission delay $d_2$ between $A_1$ and $B_i$ and between $B_i$ and P. The difference between the delays $d_1$ and $d_2$ gives information on the range difference.

The range measurement signal $S_i$ transmitted by the satellite a in its position $A_i$ at the time $\tau_i$ is assumed to be received by the observation point P as a portion of the signal $S_{AP}$ at the time $\tau_i$, as shown in FIG. 23(b). Also at this time $\tau_i$, the observation point P receives a range measurement signal $S_i$ as a portion of the signal $S_{ABP}$. Since $d_2$ is larger than $d_1$, the observation point P receives the range measurement signal $S_i$ of the signal $S_{ABP}$ after the reception of $S_i$. The difference in phase between those signals $S_i$ and $S_i'$ in $S_{ABP}$ enables detecting the range difference. From a time sequence point of view, the phase of the range measurement signal of the signal $S_{ABP}$ will come up to the phase of the range measurement signal of the signal $S_{AP}$ after a period of time required for the signal to propagate the range difference. Thus, when the phase difference between the signals $S_i$ and $S_i'$ is determined, the propagation delay indicated by the phase difference are obtained using the rate of the clock signal of the range measurement system. In this case, the propagation delay can be obtained by calculation immediately after the range measurement signal is detected by the observation point P at the time $\tau_i$ because the satellite a was at the position $A_i$ and the satellite b was at the position designated by the time signal in $S_{ABP}$ at $\tau_i$.

It may also be possible that a period of time is determined during which the phase of the range measurement signal $S_i'$ of the signal $S_{ABP}$ at $\tau_i$ comes up to the phase of the distance measurement signal $S_i$ of the signal $S_{AP}$. From this period of time the distance difference is determined. In this case the satellite a was at the position $A_i$ and the satellite b was at the position $B_{ik}$.

The positions of the satellites when the measurement of the range differences are made can be obtained by reading the times of the signal reception. The time signal of the range measurement signal $S_i$ detected at the time $\tau_i$ indicates that this range measurement signal $S_i$ was generated at the point $A_i$ on the locus 180 at the time $\tau_i$. The point $A_i$ can be determined by designating the time $\tau_j$ with respect to the orbit determination and orbit predicting value. Similarly, the time signal $\tau_{ik}$ of the signal $S_{ABP}$ also indicates the time at which the range measurement signal $S_i$ generated by the satellite a at its position $A_i$ was relayed by the satellite b located at the position $B_{ik}$, and the position $B_{ik}$ of the satellite b is definitely given through the processing of the orbit parameters. Thus, the hyperboloid which places the foci on the thus defined positions $A_i$ and $B_i$ of the satellites a and b and passed through the observation point P can be depicted.

Let's consider, as an example, the case where ten satellites a, b, c, d, e, f, g, h, i and j are positioned on an orbit and transmit the range measurement signals and the time signals. As already described, the measurement of the ranges between the satellites is performed using the inter satellite communication function. Those ten satellites are grouped to two satellite groups and three satellite groups, and the combination of each group is changed as the lapse of time. For example, at an integral-second time $\tau$, a combination $C_1$ (a, b, c), (d, e), (f, g, h) and (i, j) is formed and the original signals are generated by the satellites a, d, f, and i. From the time $\tau$ to an integral number of seconds from the time $\tau$, the time signals are successively generated. If the longest range measurement signal generated from satellites a, d, f, i is shorter than the time signal, the dummy signal is inserted to range between the end of the range measurement signal and the end of the time signal. When the measurement with the first combination $C_1$ has been complete, the measurement of a second combination $C_2$ (j, a, b), (c, d), (e, f, g), (h, i) is performed. In the case of the second combination, satellites j, c, e, h generated the original signals. In this manner, the combination of the satellite groups is changed every time an integral number of seconds has elapsed, and the measurement of the first combination starts again after 5 times if change. The observation point P can obtain range measurement data concerning four satellites with the results of the measurements of at least two adjacent combinations.

Thus, the principle of position detection according to the present invention is that the observation point P measures the difference between the time when a signal sent directly from a satellite is received and the time when the signal relayed by way of another satellite or satellites is received. In order to make an accurate detection of the range difference, the frequency of the range measurement signal must be accurate and the geometrical positions of the signal sources must also be accurately known.

The observation point P receives a signal generated by a satellite as well as a signal transmitted from and relayed by another satellite or satellites. The former signal can be used as a time signal for calculating the positions of other satellites and the latter signal can be used as a range measurement signal. It is also possible for the observation point P to make a calculation of the range between two satellites by comparing the time information of two received signals.

According to the present invention, when two signals are simultaneously transmitted from a satellite to the observation point, it is suitable to use two frequencies, predetermined different sub carriers or different kind of diffusion codes for the respective satellites.

Second Embodiment

The above-described embodiment is of a method of determining the position of the observation pint using ten satellites disposed in the geosynchronous orbits. Another embodiment will now be described in which eight satellites are disposed on geosynchronous orbits such that three of the satellites are always visible from an observation point on the earth.

As described above, it is impossible to detect the observation point only using the information of the range differences obtained from three satellites. In this embodiment, therefore, the fact that the satellites move on the orbit with the lapse of time when viewed from the earth is used. The conditions of the orbit will be described hereinbelow.

Figure 24:
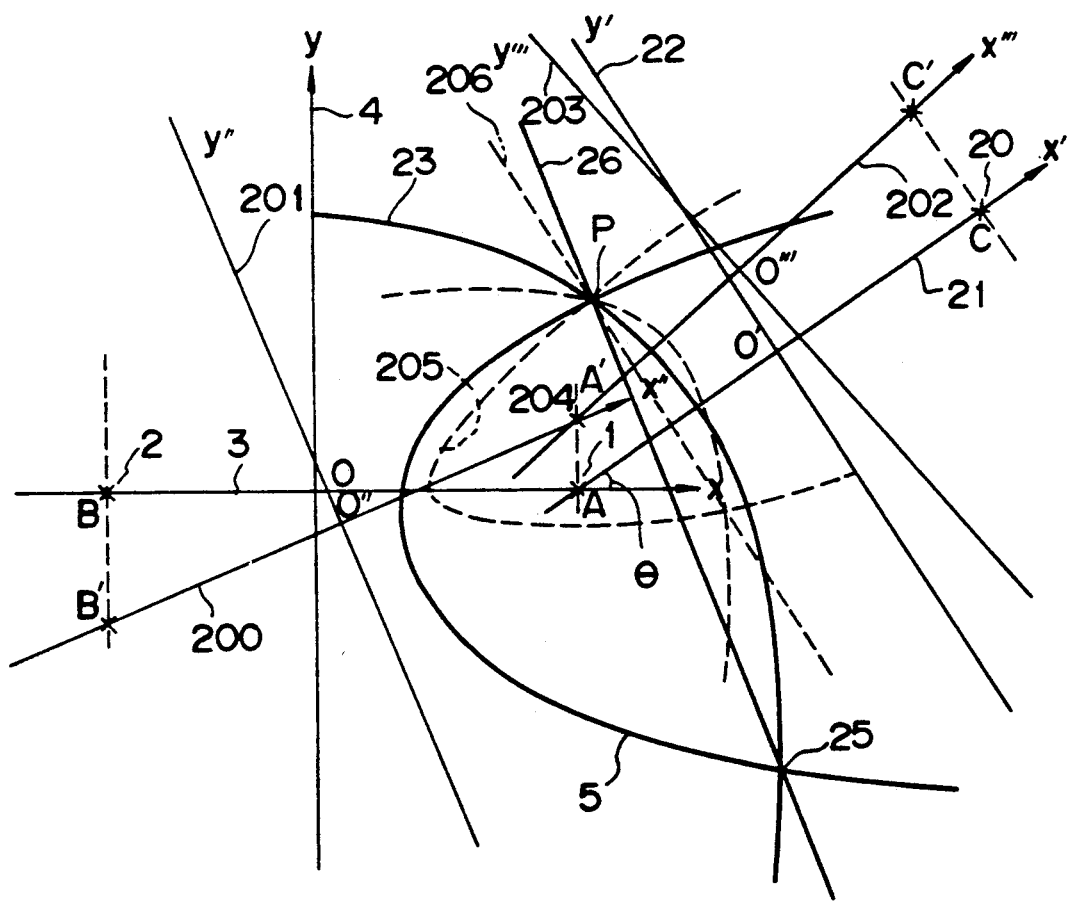
FIGS. 24 and 25 are illustrations explaining the second embodiment of a method of determining the position of an observation point using three satellites according to the present invention.

FIG. 24 shows a two dimensional relationship between the positions of satellites used for measurements at two difference times. Similar to the state shown in FIG. 4, the satellites 1, 2, and 20 were at the positions A, B and C, respectively, in x-y and x'-y' coordinate systems at a certain time. These satellites thereafter move to positions A', B' and C', respectively. The line passing through the points A', B' is the x" axis 200; the line passing through the mid-point between the points A', B' and perpendicular to the x"-axis is the y"-axis 201; the line passing through the points A' and C' is the x'''-axis 202; and the line passing through the mid point between the points A', C and perpendicular to the x'''-axis is the y'''-axis 203. Thus, a hyperbola 204 passing through the observation point P and placing the foci on the points A', B' and a hyperbola 205 passing through the observation point P and placing the foci on the points A', C' can be depicted. The reference numeral 206 is a line passing through the intersecting points of the hyperbolae 204, 205.

The x-y and x'-y' coordinate planes are on the same plane. Since the movements of the satellites 1, 2, 20 are three-dimensional, however, the positions A', B', C' of the satellites does not exist on the x-y and x'-y' planes. When the two dimensional positional relation is developed to the three-dimensional positional relation, the same relation as shown in FIGS. 4 and 5 can be applied to the positions of the satellites before and after the movements, and conditions under which the plane including the x-y, x'-y' coordinates and the plane including the x"-y", x'''-y''' coordinates intersect corresponding to the movements of the satellites are established. In other words, there is a plane which includes the x"-y", x'''-y''' coordinate system of that plane it is possible to develop the two dimensional relation to the three-dimensional relation as shown in FIGS. 4 and 5.

Figure 25:
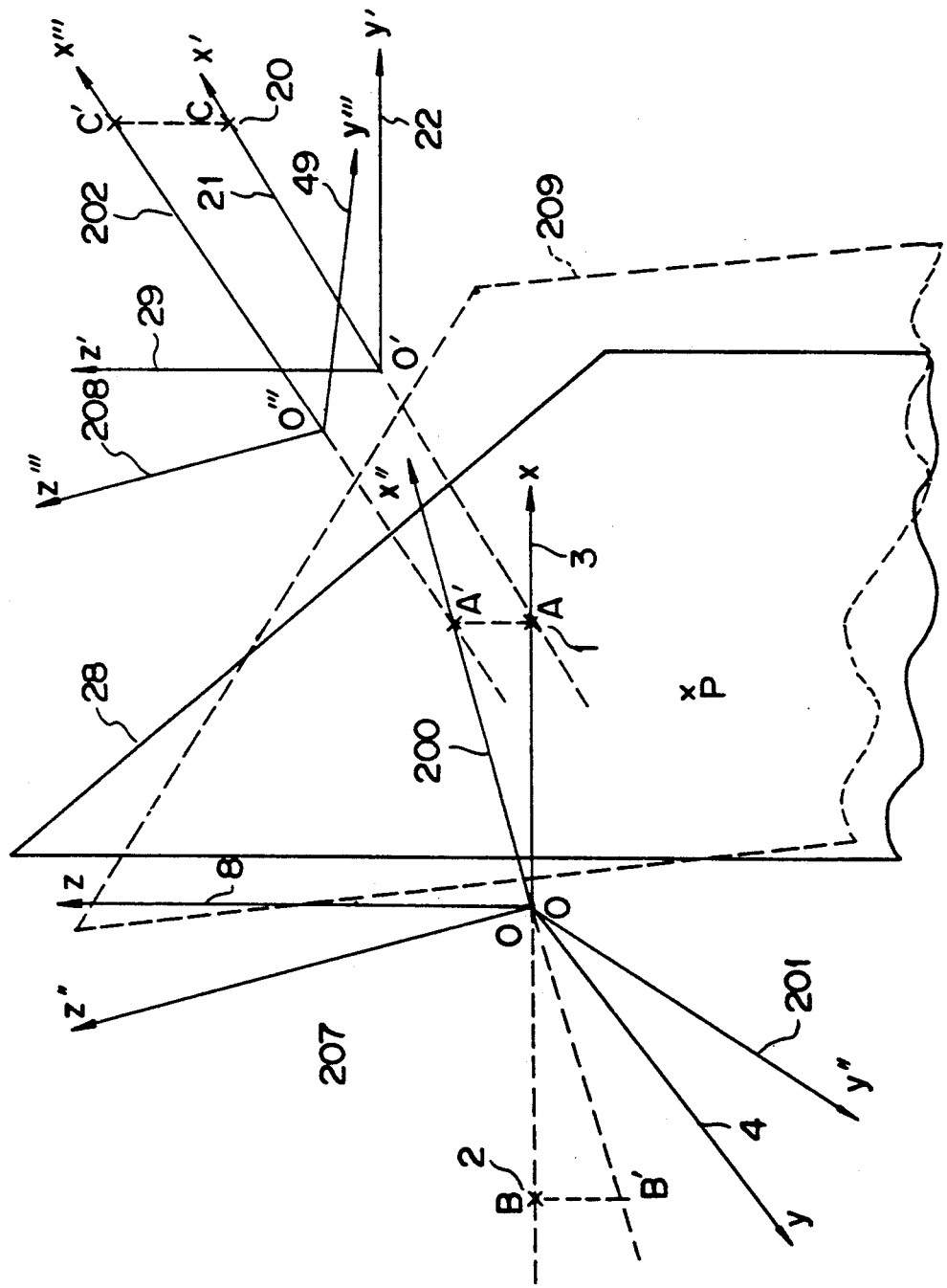

FIG. 25 shows a three-dimensional relation between the positions A, B, C and A', B' and C' of the satellites 1, 2 and 20. In this figure, the reference numeral 207 is the z"-axis and 208 is the z'''-axis. The plane including the intersecting points of the hyperboloids formed by rotating the hyperbolae 5, 23 is shown at 28, and the plane including the intersecting points of the hyperboloids formed by rotating the hyperbolae 204, 205 is shown at 209. On these planes 28, 209, quadratic curves (circles or ellipses) passing through the intersecting points of the two hyperboloids can be depicted and the observation point P exists at one of the intersecting points of these quadratic curves.

The coordinates of the positions A, B, C; A', B', C' of the satellites 1, 2, 20 and the observation point P are defined as follows:

$A(x_A, y_A, z_A)$
$B(x_B, y_B, z_B)$
$C(x_C, y_C, z_C)$
$A'(x_A', y_A', z_A')$
$B'(x_B', y_B', z_B')$
$C'(x_C, y_C', z_C')$
$P(x, y, z)$

Values to be observed are as follows:

$$AP - BP = S_1$$

$$BP - CP = S_2$$

$$A'P - B'P = S_1'$$

$B'P - C'P = S_2'$

Then, the following Equation (32) is solved in accordance with the same algorithm as described with reference to FIG. 9, and the position of the observation point P can be determined.

$$f(x, y, z) = [((x - x_A)^2 + (y - y_A)^2 + (z - z_A)^2)^{\frac{1}{2}} - \qquad (32)$$
$$((x - x_B)^2 + (y - y_B)^2 + (z - z_B)^2)^{\frac{1}{2}} - S_1]^2 +$$
$$[((x - x_B)^2 + (y - y_A)^2 + (z - z_A)^2)^{\frac{1}{2}} -$$
$$((x - x_C)^2 + (y - y)^2 + (z - z_C)^2)^{\frac{1}{2}} - S]^2 +$$
$$[((x - x_A')^2 + (y - y_A')^2 + (z - z_A')^2)^{\frac{1}{2}} -$$
$$((x - x_B')^2 + (y - y_B')^2 + (z - z_C')^2)^{\frac{1}{2}} - S_1']^2 +$$
$$[((x - x_B')^2 + (y - y_B')^2 + (z - z_B')^2)^{\frac{1}{2}} -$$
$$((x - x_C')^2 + (y - y_C')^2 + (z - z_C')^2)^{\frac{1}{2}} - S']^2$$

Figure 26:
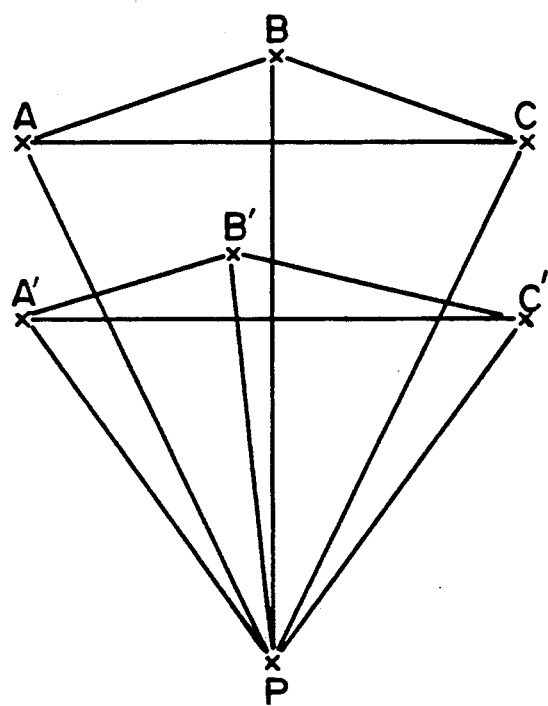
FIG. 26 is an illustration showing the relationship between an observation point and the positions of three satellites at two different times in the second embodiment.
Figure 27:
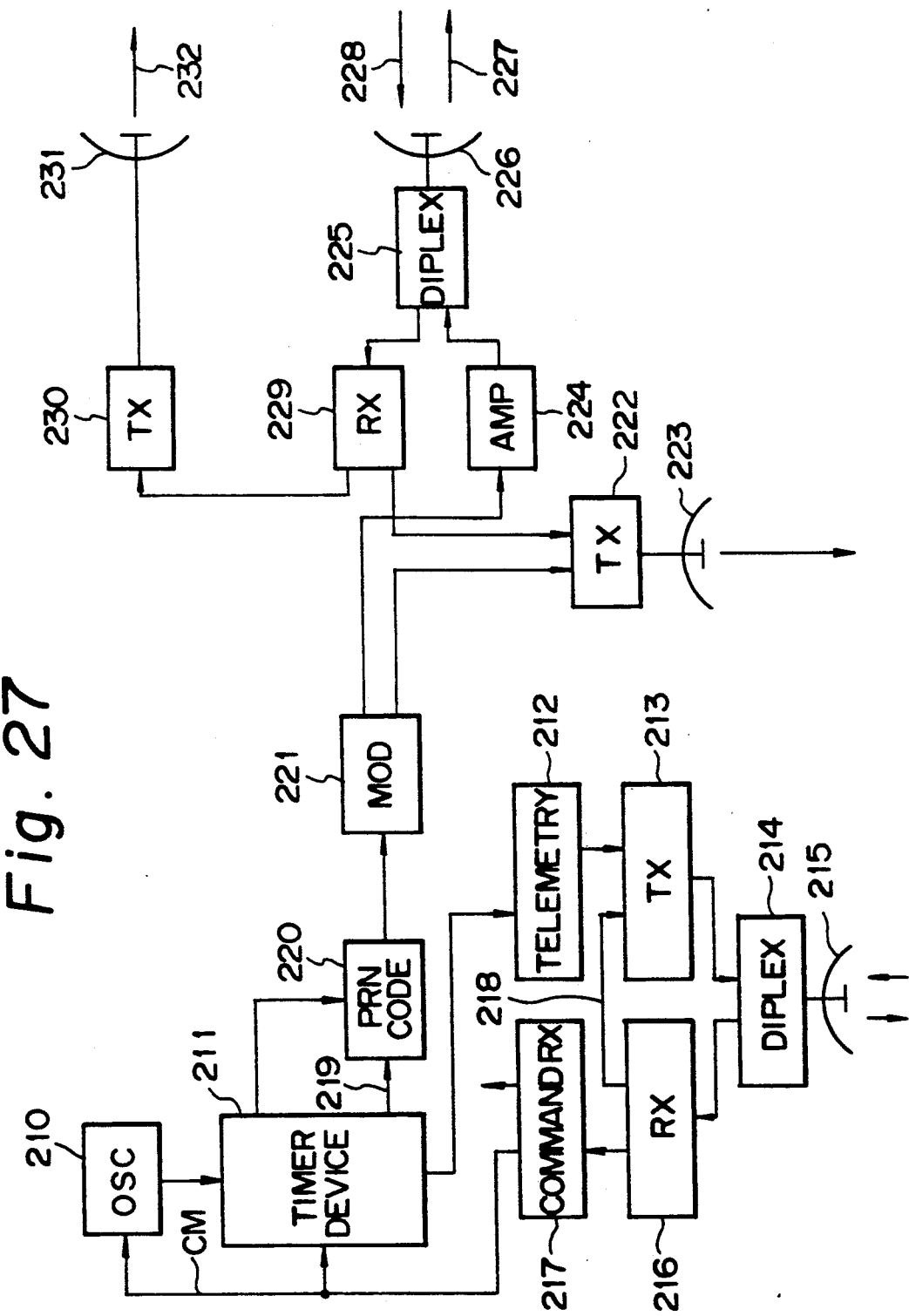
FIG. 27 is a diagram showing an example of the arrangement of a satellite capable of transmitting a reference signal to the observation point and communicating with adjacent satellites in accordance with the present invention.

FIG. 26 diagrammatically shows the relation between the positions A, B, C; A', B', C' of the satellites and the position of the observation point P.

In this embodiment, it is necessary that three satellites are disposed to be always visible from the observation point. The angle of elevation of each satellite from the ground surface is desirably as high as possible in order to avoid the range of vision from being interfered by a building or the like, but in such a case the number of satellites must increase. The relation between the angle of elevation and the number of satellites positioned on the equatorial plane necessary for covering entirely the earth is shown in Table 3. If the angle of elevation is set at an appropriate angle, for example, at about 5 degrees, the number of satellites needed is 7.

TABLE 3

| Angle of Elevation | Number of Satellites Needed |
|---|---|
| 5 degrees | 7 |
| 10 degrees | 8 |
| 15 degrees | 8 |

Table 3 shows the relation between the angle of elevation and the number of satellites using the angle of elevation as a parameter in the case where three satellites always visible from the observation point P are positioned on the orbit between OQ and OQ' of FIG. 10. It is desirable that these three satellites are distributed on a plane when viewed from the observation point P and should not be on a single line.

The method of distance measurement in the present embodiment is generally similar to that of the first embodiment, but in the present embodiment it is assumed that three satellites are on geosynchronous orbits, positioned latitudinally 8,600 km away from the equatorial plane and maximally spaced from one another, although the practical inter-satellite spacing is not so large as described above. Since the range between two satellites is 31,500 km, as described above, the range along which a signal transmitted by the satellite 1 at the position A is relayed by the satellites 2, 20 at the positions B, C and then reaches the observation point P is 99,000 km (=31,500×2+3,600) at the maximum. Thus, the time required for the signal propagation along this range is about 0.33 seconds.

Also in this second embodiment, when the distance measurement signal and the time signal are transmitted between the eight satellites and between them and the observation point, the eight satellites are grouped into two groups including three satellites and one group including two satellites, and the combination of satellites in the respective groups is successively changed in the manner similar to that of the first embodiment described with reference to FIG. 18.

Construction of Satellites

The construction of the satellites for practicing the method of position measurement described by way of the first and second embodiments will be described with reference to FIGS. 27 to 30. In a satellite shown in FIG. 27, the output of the timer device 211 controlled by a crystal oscillator 210 is supplied through telemetry device 212, transmitter 213, diplexer 214 and antenna 215 to the control station. The control station compares this signal with a signal indicating the national standard time and..transmits to the satellite a command for finely adjusting the oscillation frequency of the crystal oscillator 210 and calibrating the timer device 211. This command is received through the antenna 215, a receiver 216 and a command receiver 217 which then supplies a command CMD for correction to the crystal oscillator 210 and the timer device 211. The telemetry device 212 and the command receiver 217 are also used for usual satellite bus instruments in addition to the calibration of time. The control station transmits to and receives from the satellite signals for obtaining the range and range rate data. This signal is fed through a return route 218 and the receiver 216 to the transmitter 213. The control station uses this signal to determine the orbit of this satellite. A PRN code generator 220 receives a clock signal 219 from the timer device 211 and generates a series of PRN codes which are applied through a modulator 221 to a transmitter 222 and an antenna 223. At the same time, the output signal of the modulator 221 is transmitted through an amplifier 224, a diplexer 225 to an antenna 226 as a signal 227 to other satellites. In order to receive a signal from the preceding satellite and transmit the signal to the observation point and at the same time to the subsequent satellite, a signal 228 from the preceding satellite is received by the antenna 226, fed through the diplexer 225 and a receiver 229 to the transmitter 222 and transmitted by the antenna 223 to the observation point P. At the same time this signal is transmitted through a transmitter 230 and an antenna 231 to the subsequent satellite as a signal 232.

Figure 28:
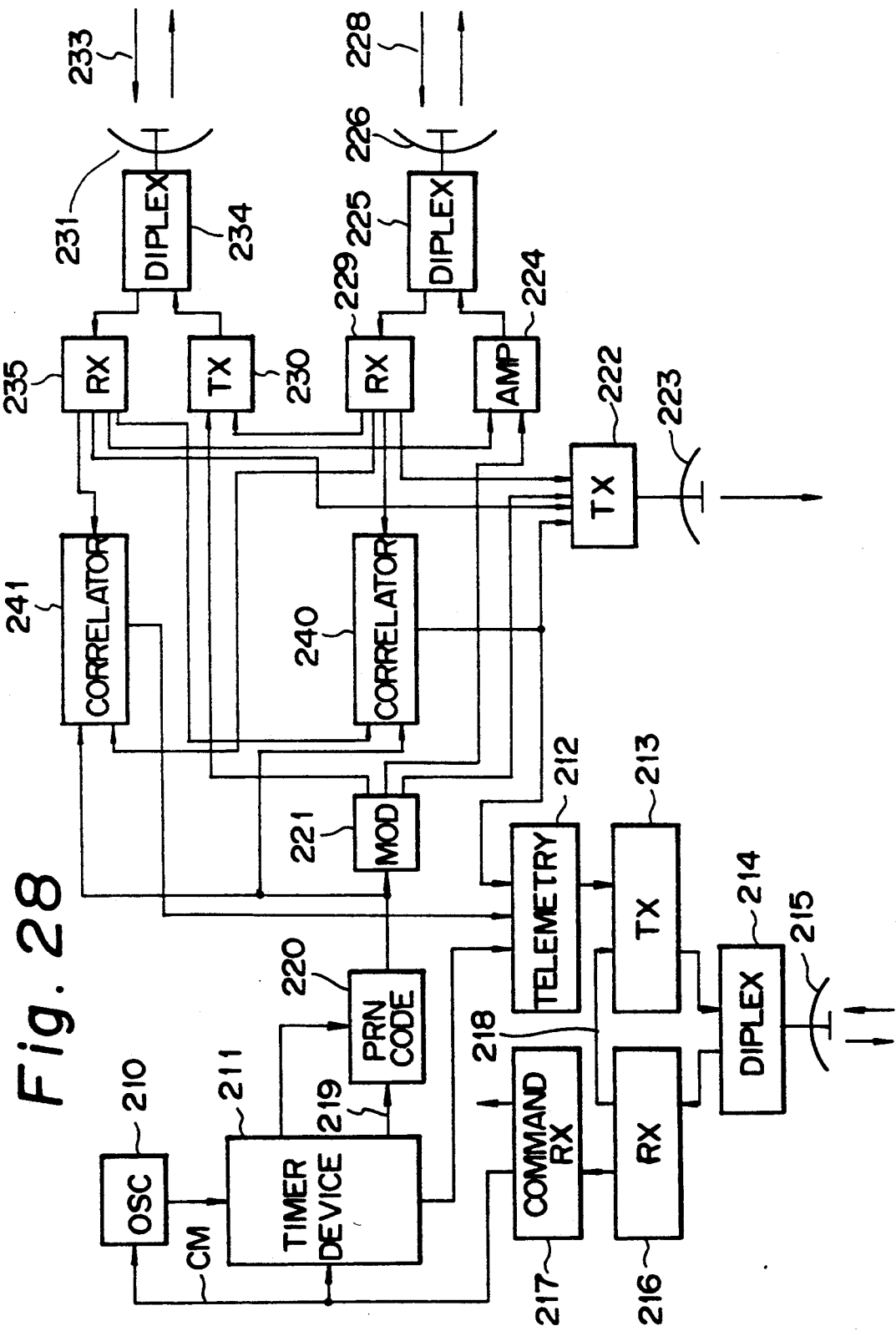
FIG. 28 is an illustration of a modified arrangement of the satellite of FIG. 27.

FIG. 28 shows the arrangement of a satellite which has a circuit for determining the inter-satellite distance in accordance with Equation (22). The signal 228 sent from another satellite is fed to a correlation device 240. To obtain a correlation between the signal 228 and the original signal, the output of the PRN code generator 220 is input to the correlation device 240. When a correlation between the signal 228 and a signal sent from the subsequent satellite is obtained, the signal 33 from the subsequent satellite is received by the antenna 231 and fed through the diplexer 234 and the receiver 235 to the correlation device 240.

The result calculated by the correlation device 240 is transmitted through the transmitter 222 and the antenna 223 to the observation point. Similar to the above described correlation system, a correlation device 241 calculates a correlation between the signal 33 and the output of the PRN code generator 220 or between the signal 233 and the signal 228 and transmits the result through the telemetry device 212, the transmitter 213, the diplexer 214 and the antenna 215 to the control station.

Figure 29:
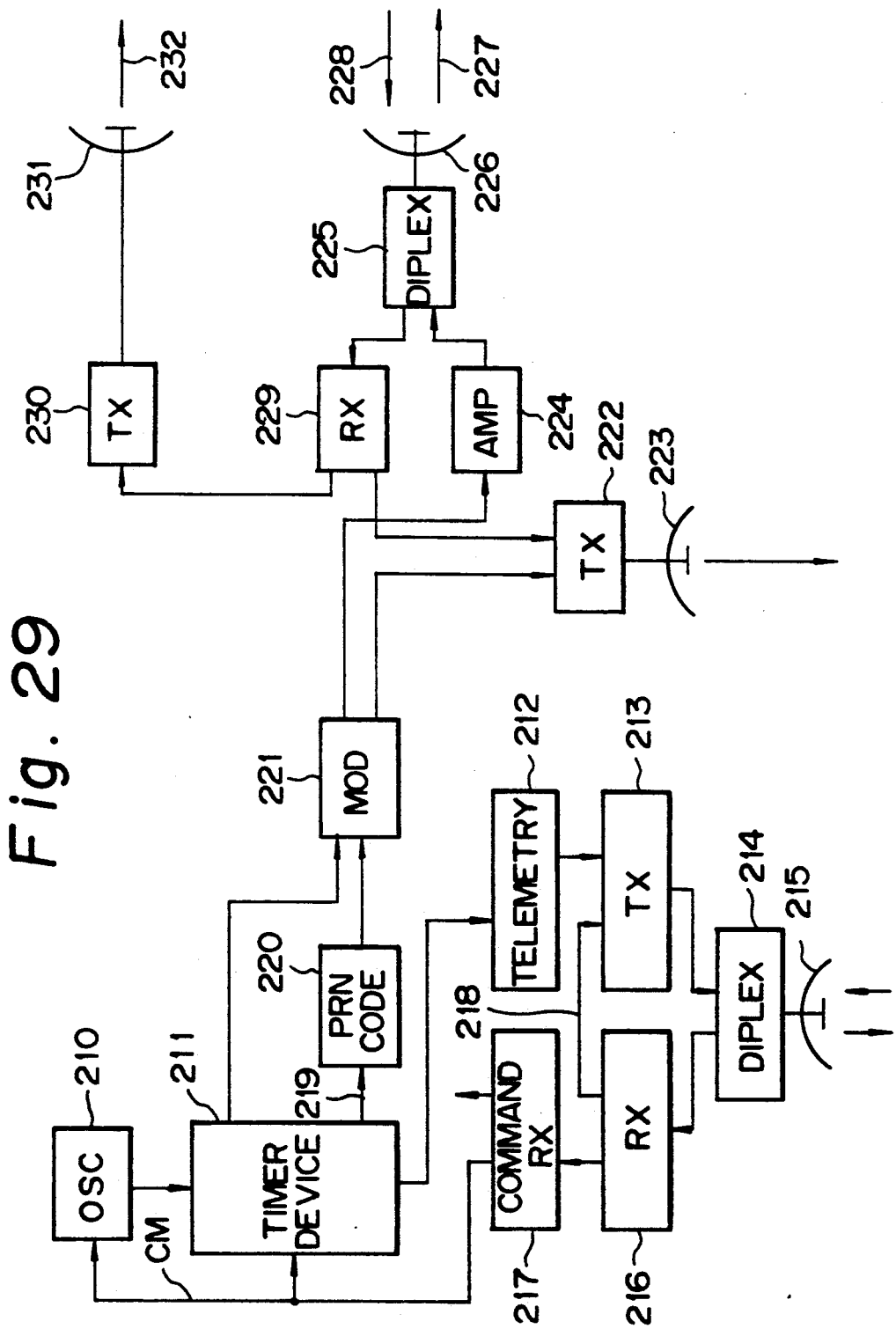
FIG. 29 is an illustration showing another example of the arrangement of a satellite capable of transmitting a signal generated by synthesizing a time signal and a distance measurement signal.

FIG. 29 shows the construction of a satellite capable of transmitting a signal made by synthesizing the distance measurement signal and the time signal and having the signal format shown in FIG. 21. The modulator 221 generates a QPM signal such that the phase of the PRN code is in synchronism with the time when the PRN code is generated. The remaining elements of the satellite and the operation thereof are similar to those in FIG. 27 and further explanations are omitted here.

Figure 30:
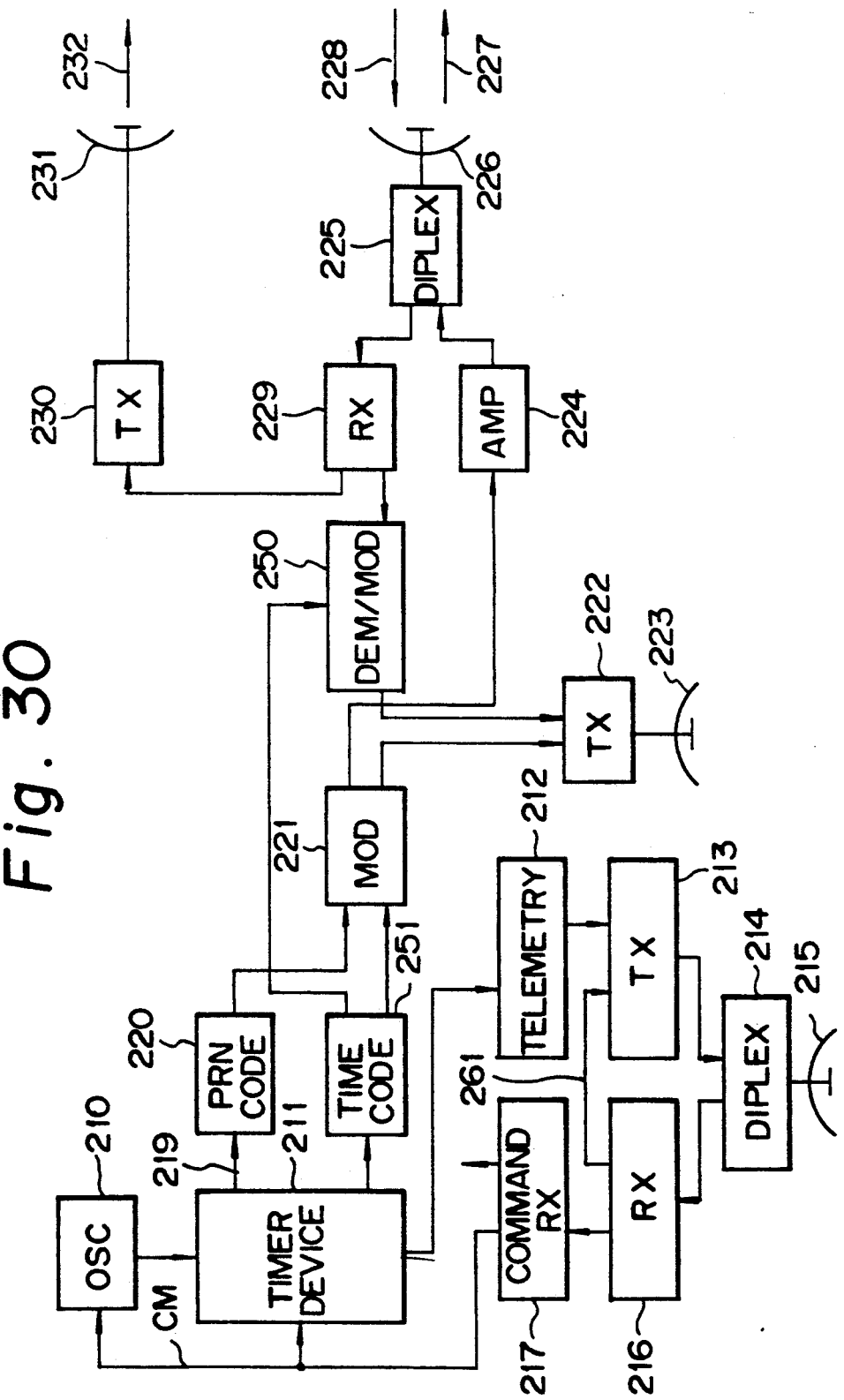
FIG. 30 is an illustration of a modified arrangement of the satellite of FIG. 29.

FIG. 30 shows a modification of the arrangement shown in FIG. 29. The signal 228 received by the antenna 226 from the preceding satellite is fed through the diplexer 225 to the receiver 229. The output of the receiver 229 is transmitted through the transmitter 230 and the antenna 231 to the subsequent satellite and at the same time fed to a demodulator/modulator 250. The demodulator/modulator 250 operates so as to reserve the range measurement signal in the signal 228 and replace the time signal in the signal 228 with the time signal from a time code device 251. The output of the demodulator/modulator 250 is transmitted through the transmitter 222 and the antenna 223 to the observation point.

Although the present invention has been described in detail with a particular reference to some of the embodiments, it should be understood that those skilled in the art can achieve various changes and modifications without departing the spirit and scope of the present invention.

For example, the present invention should not be limited to the position determination of an observation point on the ground. The expression "observation point on the ground" should be considered throughout the description and the claims to include an observation point on the ground as well as an observation point other than on the ground.

What is claimed is:

1. A method of determining the position of an observation point on the earth using M satellites disposed on geosynchronous orbits, comprising the steps of:
   (a) transmitting a reference signal at a predetermined time from a first one of N satellites of M satellites ($N<M$) disposed on geosynchronous orbits to an observation point and to an adjacent second satellite of the N satellites, the geosynchronous orbits having a predetermined orbit inclination angle with respect to the equitorial plane such that the sequence of N satellites of the M satellites are simultaneously in the range of vision of said observation point;
   (b) causing the second to (N-1)th satellites to relay the reference signal received from each of their respective adjacent preceding satellites to the respective adjacent subsequent third to Nth satellites, said second to Nth satellites sending signals to the observation point when the reference signal is received from the respective adjacent preceding satellite;
   (c) measuring at the observation point the arrival times of the reference signals transmitted from the N satellites;
   (d) calculating the orbit position of the N satellites on the basis of the arrival times obtained in said step (c) and estimated values of the orbit positions of the satellites within the geosynchronous orbits provided by a control station on the earth; and
   (e) determining at least three hyperboloids each having foci on adjacent two of the calculated orbit positions of the N satellites, whereby the position of the observation point is determined at an intersecting point of the hyperboloids.

2. A method as set forth in claim 1, wherein said step (e) includes the step of calculating the mutual range between two adjacent satellites of the N satellites.

3. A method set forth in claim wherein number N is at least four.

4. A method of determining the position of an observation point on the earth using five or more satellites disposed on geosynchronous orbits, comprising the steps of:
   (a) transmitting a reference signal at a predetermined time from a first one of four satellites of five or more satellites disposed on geosynchronous orbits to an observation point and to a second satellite adjacent to the first satellite, the geosynchronous orbits having an inclination angle of substantially 6 degrees with respect to the equitorial plane such that a sequence of four satellites of the five or more satellites are simultaneously in the range of vision of the observation point and that the anomalies of the four satellites are separated from one another substantially at an angle of 120 degrees at the same point of time
   (b) causing in the sequential order the second and third satellites to relay the reference signal to the adjacent third and fourth satellite respectively;
   (c) causing the second to fourth satellites each in response to receipt of the reference signal from the adjacent respective first to third satellites to transmit the received reference signal to said observation point;
   (d) determining at the observation point the times of reception of the reference signals transmitted from the four satellites;
   (e) calculating the positions of the four satellites using the reception times determined in said step (d) and estimated values of the orbit positions of the four satellites within the geosynchronous orbits obtained from a control station on the earth; and
   (f) determining three hyperboloids each having foci on adjacent two of the calculated positions of the four satellites, whereby the position of the observation point is determined as an intersectingg point of the hyperboloids.

5. A method as set forth in claim 4, wherein said step (a) includes transmitting the reference signal from the first of the four satellites at a time calibrated by the control station.

6. A method as set forth in claim 5, wherein said transmitting step of said step (a) includes transmitting the reference signal from the first of the four satellites at a time calibrated by the control station at an integral-second time.

7. A method as set forth in claim 6 further including the steps of calculating the mutual range between a satellite and an adjacent subsequent satellite and transmitting the calculated results to the observation point.

8. A method as set forth in claim 5, wherein said step (a) comprises:
   calibrating a clock means in the first of four satellites by a signal sent from the control station;
   in response to the calibrated clock means, transmitting from the first of four satellites a reference signal to the observation point; and
   transmitting from the first four satellites the reference signal to the adjacent subsequent satellite.

9. A method for determining the position of an observation point on the earth using five or more satellites disposed on geosynchronous orbits, comprising the steps of:

(a) transmitting a synthesized signal including a time signal designating a transmission time and a reference signal synchronized with the time signal from a first one of four adjacent satellites disposed on geosynchronous orbits to an observation point and to an adjacent subsequent satellite to the first satellite, the geosynchronous orbits having an inclination angle of 6-10 degrees with respect to the equitorial plane such that four adjacent satellites of the five or more satellites are simultaneously in the range of vision of the observation point and that the anomalies of the four satellites are separated from one another substantially at an angle of 120 degrees at the same point of time;

(b) allowing, in sequential order, the adjacent subsequent satellite and the remaining two satellites to transmit a new synthesized signal including the reference signal and a time signal designating a time at the respective satellite, to the observation point and an adjacent subsequent satellite thereto;

(c) determining at the observation point times of reception of the signals transmitted from the four satellites;

(d) calculating the orbit positions of the four satellites from the reception times determined in said step (c) and estimated values of the orbit position of the four satellites within the geosynchronous orbits obtained from the control station on the earth; and (e) determining three hyperboloids each having foci on adjacent two of the calculated orbit positions of the four satellites, whereby the position of the observation point is determined as an intersecting point of the hyperboloids.

10. A method as set forth in claim 9, wherein said steps (a) and (b) comprise:

calibrating a clock means for producing a timing signal in the first of four satellites by a command signal sent from the control station;

generating a reference signal for range measurement;

producing a synthesized signal including the timing signal and the reference signal; and transmitting from the first of four satellites th synthesized signal to the observation point and the adjacent subsequent satellite.

11. A method as set forth in claim 10, wherein said calibrating step further includes the step of producing the command signal at the control station.

12. A method as set forth in claim 11, wherein said producing step includes the step of producing the command signal on the basis of the time signal contained in the synthesized signal received by the observation point, the calculated positions of the orbits and predicted values of the orbit positions of the four satellites and the standard time at the control station.

13. A method of determining the position of an observation point on the earth using four satellites disposed on geosynchronous orbits comprising the steps of:

(a) transmitting a synthesized signal including a time signal designating a transmission time and a reference signal synchronized with the time signal, from a first of adjacent three satellites disposed on geosynchronous orbits to an observation point and to an adjacent subsequent satellite, the geosynchronous orbits having the inclination angle of substantially 6 degrees with respect to the equitorial plane, such that a sequence of first, second and third satellites of said four satellites are simultaneously in the range of vision of said observation point and that the anomalies of said three satellites are separated from one another substantially at an angle of 120 degrees at the same point of time;

(b) allowing, in sequential order, an adjacent subsequent satellite to the first satellite and remaining subsequent satellites to each transmit a new synthesized signal including the synthesized signal, and a time signal designating a time at the satellite, to the observation point and an adjacent subsequent satellite, thereto;

(c) repeating said steps (a) and (b) after the lapse of a period sufficient for detecting the orbit positions of the three satellites;

(d) determining at the observation point the times of reception of the synthesized signals transmitted from the three satellites in said steps (a) and (b);

(e) calculating the positions of the three satellites when they perform the operations in said steps (a) and (b), using the times determined in step (d) and estimated values of the orbit positions of the three satellites within the geosynchronous orbits obtained from a control station on the earth; and (f) determining three hyperboloids each having foci on adjacent two of the positions of the three satellites calculated in said step (e), whereby the position of the observation point is determined as an intersecting point of the hyperboloids.

14. A method as set forth in claim 13, wherein said steps (a) and (b) comprise:

calibrating a clock means for producing a timing signal in the first of adjacent three satellites by a command signal sent from the control station;

generating a reference signal for rang measurement;

producing a synthesized signal of the timing signal and the reference signal; and transmitting the synthesized signal to the observation point and an adjacent subsequent satellite.

15. A method as set forth in claim 14, wherein said calibrating step further includes a step of producing the command signal at the control station.

16. A method as set forth in claim 15, wherein said producing step includes the step of producing the command signal on the basis of the time signal contained in the synthesized signal received by the observation point, the calculated positions of the orbit and predicted values of the orbit positions of the respective three satellites and the standard time at the control station.

* * * * *